(12) United States Patent
Oume et al.

(10) Patent No.: US 10,381,608 B2
(45) Date of Patent: Aug. 13, 2019

(54) FLAT TYPE BATTERY

(71) Applicant: Nissan Motor Co., Ltd., Yokohama-shi, Kanagawa (JP)

(72) Inventors: Ami Oume, Kanagawa (JP); Azusa Matsuo, Kanagawa (JP); Takamitsu Saito, Kanagawa (JP); Takehiro Maeda, Kanagawa (JP); Yoshiaki Nitta, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/578,796

(22) PCT Filed: Jul. 1, 2015

(86) PCT No.: PCT/JP2015/069027
§ 371 (c)(1),
(2) Date: Dec. 1, 2017

(87) PCT Pub. No.: WO2017/002235
PCT Pub. Date: Jan. 5, 2017

(65) Prior Publication Data
US 2018/0166663 A1    Jun. 14, 2018

(51) Int. Cl.
| | |
|---|---|
| *H01M 2/02* | (2006.01) |
| *H01M 2/30* | (2006.01) |
| *H01M 10/04* | (2006.01) |
| *H01M 10/0525* | (2010.01) |
| *H01M 10/0585* | (2010.01) |
| *H01M 2/08* | (2006.01) |
| *H01M 4/62* | (2006.01) |

(52) U.S. Cl.
CPC .......... *H01M 2/0275* (2013.01); *H01M 2/02* (2013.01); *H01M 2/30* (2013.01);
(Continued)

(58) Field of Classification Search
None
See application file for complete search history.

(56) References Cited

U.S. PATENT DOCUMENTS

| | | |
|---|---|---|
| 7,438,989 B2 | 10/2008 | Watanabe |
| 2005/0079757 A1 | 4/2005 | Watanabe |

(Continued)

FOREIGN PATENT DOCUMENTS

| | | |
|---|---|---|
| CN | 1606181 A | 4/2005 |
| CN | 1692520 A | 11/2005 |

(Continued)

*Primary Examiner* — Alix E Eggerding
(74) *Attorney, Agent, or Firm* — Global IP Counselors, LLP

(57) ABSTRACT

A flat type battery includes an exterior member housing an electrolytic solution and a power generating element. The power generating element contains electrodes alternating layered between electrolyte layers, and expands with use in a layering direction of the electrodes. The exterior member forms a tightly sealed space in which the power generating element is housed, and in which an extra space is formed between the exterior member and a side surface extending along the layering direction of the power generating element. The exterior member includes a volume adjustment portion allowing for an increase in the volume of the extra space by expanding in response to a pressure rise inside the tightly sealed space while the exterior member is being pressed against the surfaces intersecting the layering direction of the power generating element due to a pressure difference between the exterior and the interior.

11 Claims, 16 Drawing Sheets

(52) U.S. Cl.
CPC ... *H01M 10/0413* (2013.01); *H01M 10/0525* (2013.01); *H01M 10/0585* (2013.01); *H01M 2/08* (2013.01); *H01M 4/621* (2013.01); *H01M 2220/20* (2013.01)

(56) References Cited

U.S. PATENT DOCUMENTS

2006/0257732 A1* 11/2006 Yageta .................. H01M 2/021
                                                        429/176
2011/0135997 A1*  6/2011 Watanabe ........... H01M 2/0212
                                                        429/162
2011/0287308 A1* 11/2011 Kim ........................ B29C 43/18
                                                        429/176

FOREIGN PATENT DOCUMENTS

| CN | 101217189 A | 7/2008 |
|----|-------------|--------|
| CN | 103035871 A | 4/2013 |
| EP | 1 291 934 A2 | 3/2003 |
| JP | 2001-297748 A | 10/2001 |
| JP | 2003-288883 A | 10/2003 |
| JP | 2005-116482 A | 4/2005 |
| JP | 39993320 B2 | 10/2007 |
| JP | 2012-146435 A | 8/2012 |

* cited by examiner

FLAT TYPE BATTERY

CROSS-REFERENCE TO RELATED APPLICATIONS

This application is a U.S. National stage application of International Application No. PCT/JP2015/069027, filed Jul. 1, 2015.

BACKGROUND

Field of the Invention

The present invention relates to a flat type battery. The flat type battery of the present invention is used, for example, as a driving power source or an auxiliary power source for a motor, or the like, of vehicles, such as fuel cell vehicles and hybrid electric vehicles.

Background Information

Conventionally, as a battery corresponding to one form of a flat type battery, there is a lithium ion secondary battery that is configured by sealing a laminate type power generating element, which carries out charging/discharging, and an electrolytic solution, with an exterior member (see, Japanese Laid-Open Patent Application No. 2001-297748 referred to herein as Patent Document 1).

The power generating element is configured by laminating an electrolyte layer, which holds an electrolyte, and an electrode. The power generating element expands in the layering direction with use.

The exterior member forms a tightly sealed space that contains a space in which the power generating element is housed, and an extra space. The exterior member is pressed against a surface, which intersects the layering direction of the power generating element, due to a pressure difference between the pressure of the tightly sealed space and the pressure of the exterior space.

SUMMARY

Inside the power generating element, while charging and discharging are repeated, the active material in the electrode reacts with the electrolytic solution to generate gas. Part of the gas that is generated inside the power generating element moves to the extra space.

At this time, if the volume of the extra space is small, the pressure inside the tightly sealed space formed by the exterior member easily rises due to the movement of the gas. As a result, the movement of the gas to the extra space is not carried out smoothly. Therefore, there is the problem that the amount of electrolytic solution in the power generating element is relatively reduced due to gas remaining in the power generating element, which results in the occurrence of partial liquid depletion.

On the other hand, if the volume of the extra space is large, the shape of the extra space tends to change greatly, as the pressure inside the tightly sealed space formed by the exterior member rises. If the shape of the extra space changes greatly, a force acts on the exterior member to separate the exterior member from a surface intersecting the layering direction of the power generating element. Thus, part of the gas that has moved to the space easily enters between the exterior member and the surface intersecting the layering direction of the power generating element. As a result, there is the problem that pressure from the exterior member is not uniformly applied to the surface intersecting the layering direction of a power generating element, so that the performance of the battery deteriorates.

Therefore, in order to solve the problem described above, an object of the present invention is to provide a flat type battery capable of preventing liquid depletion while maintaining a state in which pressure from an exterior member acts uniformly onto a surface intersecting the layering direction of a power generating element.

The flat type battery according to the present invention, which realizes the object described above, comprises an electrolytic solution, and a power generating element that contains electrolyte layers and a plurality of electrodes layered with each of the electrolyte layers therebetween, and that expands with use in the layering direction of the electrodes. The flat type battery according to the present invention further comprises an exterior member that forms a tightly sealed space that contains a space in which the power generating element is housed and an extra space. The extra space is formed between the exterior member and a side surface along the layering direction of the power generating element. The exterior member includes a volume adjustment portion that allows for an increase in the volume of the extra space by expanding in accordance with a pressure rise inside the tightly sealed space while the exterior member is being pressed against the surfaces intersecting the layering direction of the power generating element due to a pressure difference between the exterior and the interior. The volume adjustment portion allows for an increase in the volume of the extra space while maintaining the state in which the exterior member is pressed against the surfaces intersecting the layering direction of the power generating element.

BRIEF DESCRIPTION OF THE DRAWINGS

Referring now to the drawings, a lithium ion secondary battery is illustrated.

DETAILED DESCRIPTION OF THE EMBODIMENTS

Figure 1:
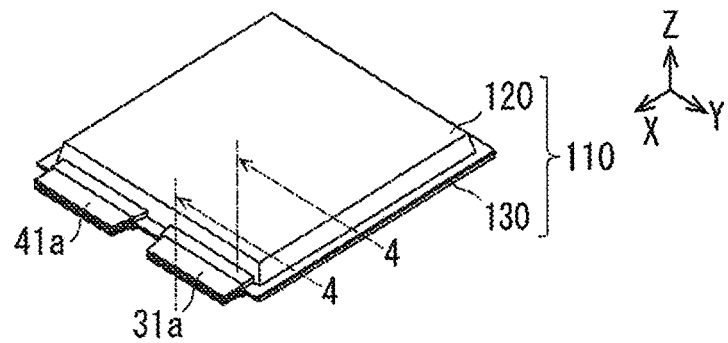
FIG. 1 is a perspective view of a lithium ion secondary battery according to a first embodiment.

The first embodiment, the second embodiment, and the third embodiment according to the present invention will be described below, with reference to the appended drawings.

In the explanations of the drawings, the same elements are assigned the same reference symbols, and redundant explanations are omitted.

In all of the figures from FIGS. 1 to 19, the directions are shown using arrows indicated by X, Y, and Z. The direction of the arrow indicated by X indicates the length direction of the flat type battery (corresponding to the direction intersecting the layering direction of the power generating element). The direction of the arrow indicated by Y indicates the width direction of the flat type battery that intersects the length direction X (corresponding to the direction intersecting the layering direction of the power generating element). The direction of the arrow indicated by Z indicates the layering direction of the power generating element.

The sizes and ratios of the members in the drawing may be exaggerated for the sake of explanation, and may be different from the actual sizes and ratios. For example, the thicknesses of the members along the layering direction (Z direction) are exaggerated in FIGS. 4-6, and the like.

First Embodiment

The flat type battery will be described with reference to FIGS. 1-9.

First, the configuration of the flat type battery will be described with reference to FIGS. 1-6, based on a lithium ion secondary battery 100 comprising a laminated type power generating element as an example.

Figure 2:
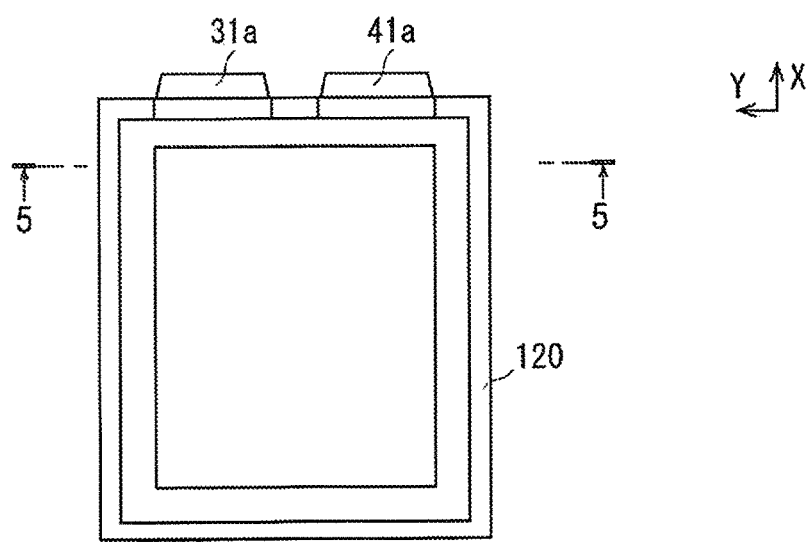
FIG. 2 is a plan view of the lithium ion secondary battery.
Figure 3:
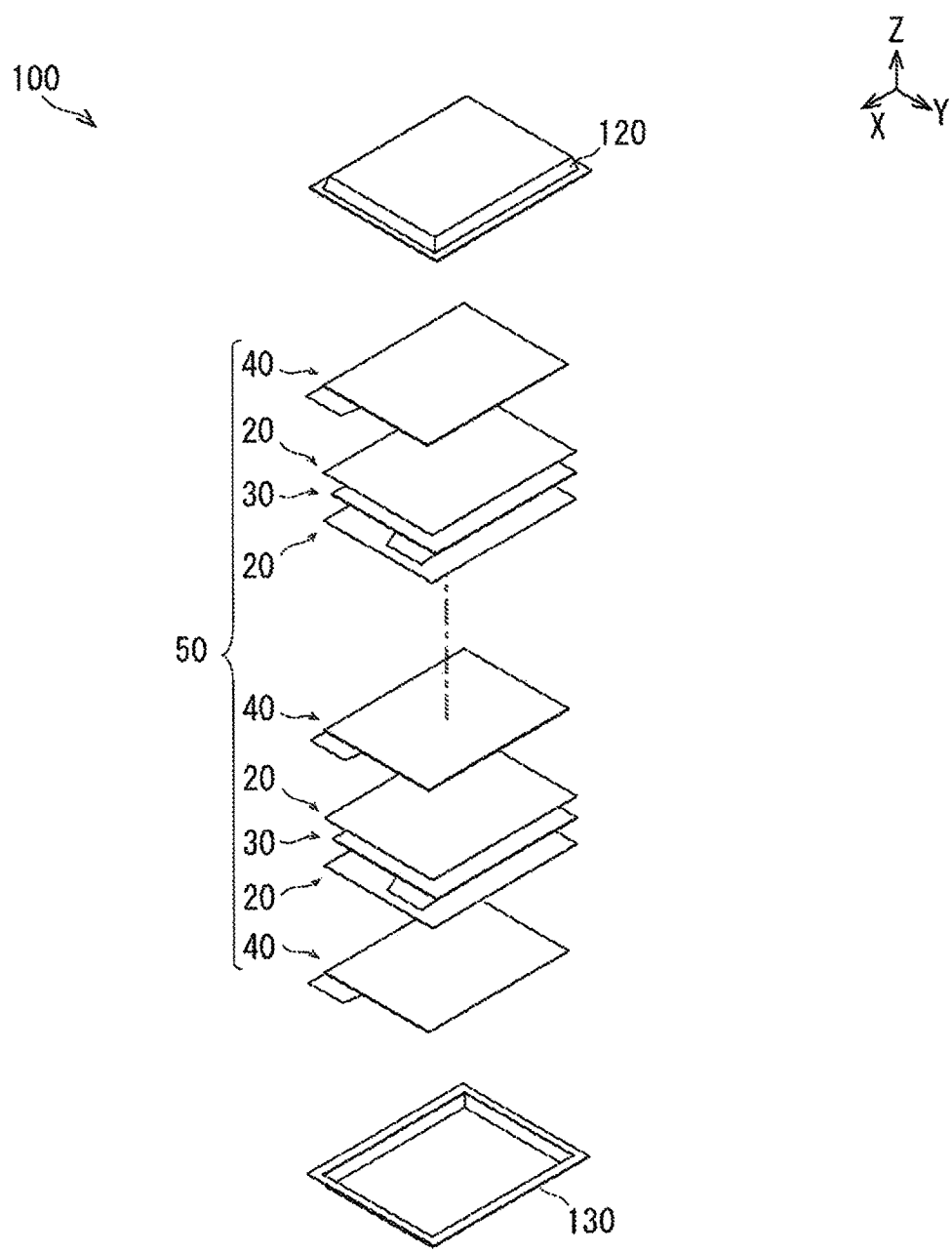
FIG. 3 is an exploded perspective view of the lithium ion secondary battery disassembled into constituent parts.
Figure 4:
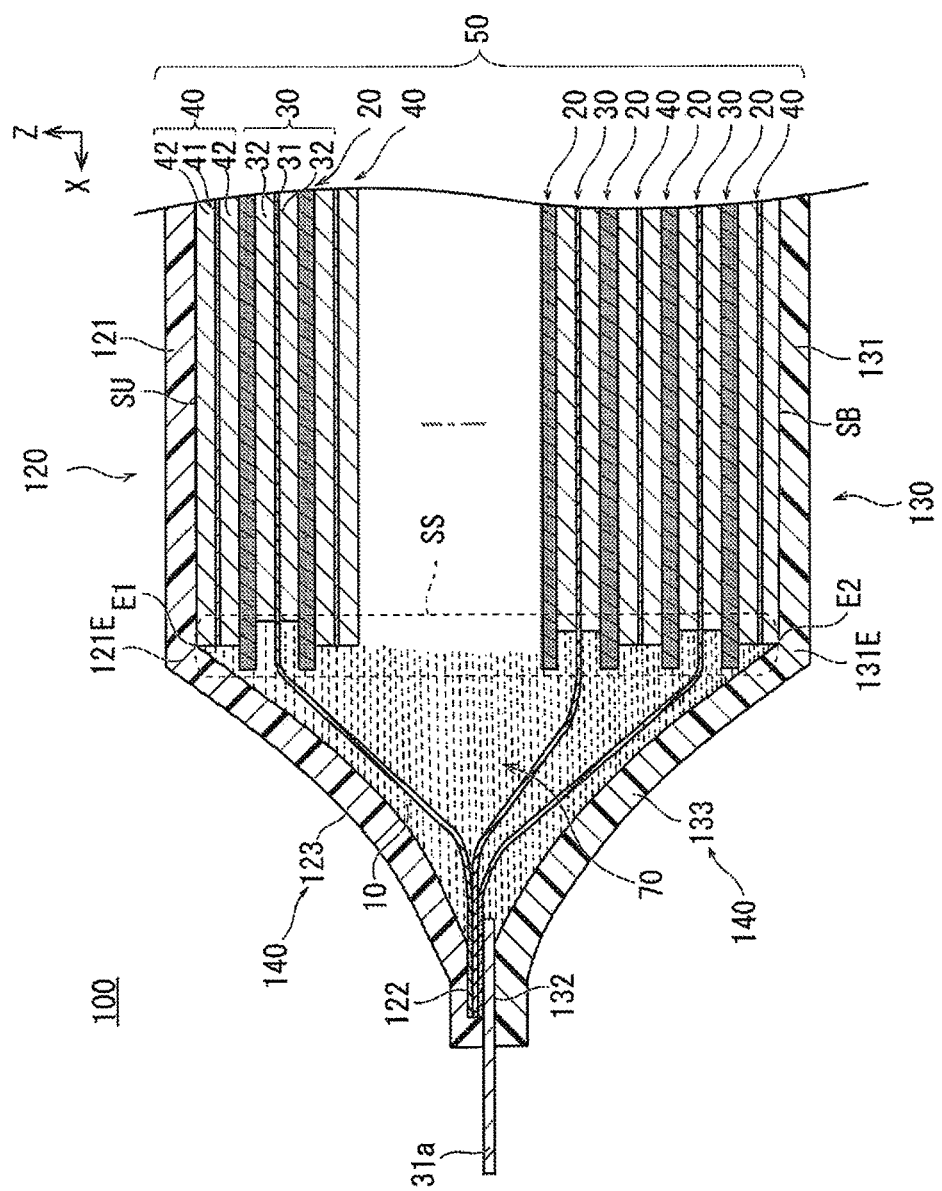
FIG. 4 is a partial end view of a section of the lithium ion secondary battery of FIG. 1 through line 4-4.
Figure 5A:
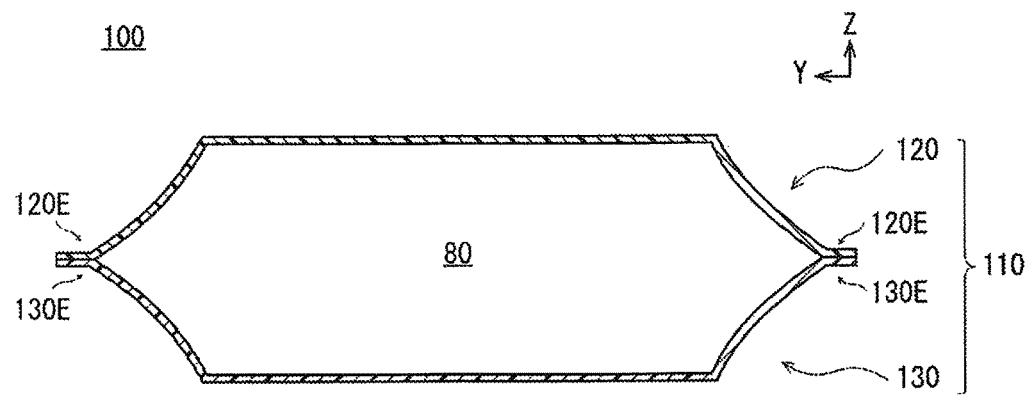
FIGS. 5A and B are schematic views of a section of the lithium ion secondary battery of FIG. 2 through line 5-5, with the electrolytic solution and the power generating element omitted.
Figure 6:
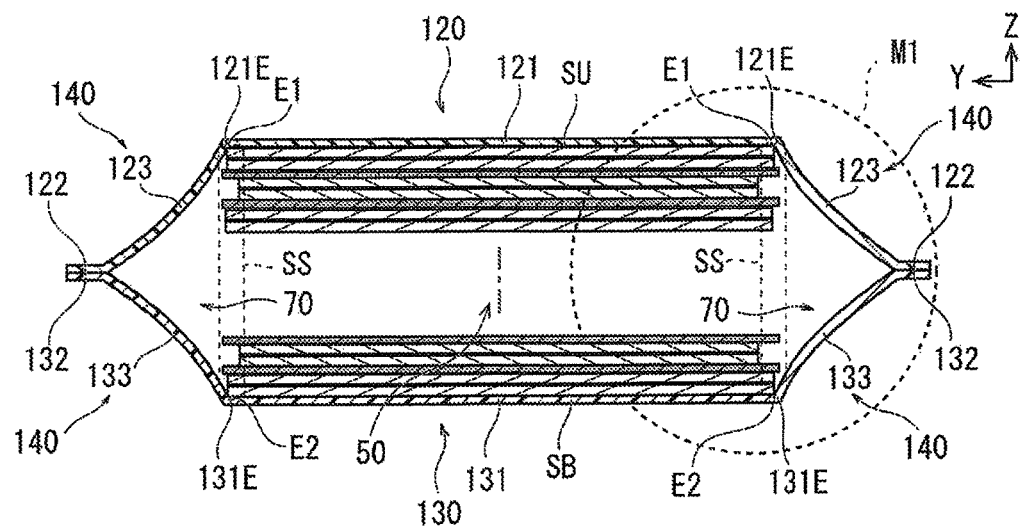
FIG. 6 is a view of a section of the lithium ion secondary battery of FIG. 2 through line 5-5.

FIG. 1 is a perspective view illustrating a lithium ion secondary battery 100 according to the present embodiment. FIG. 2 is a plan view illustrating the lithium ion secondary battery 100. FIG. 3 is an exploded perspective view illustrating the lithium ion secondary battery 100 disassembled into constituent parts. FIG. 4 is a partial end surface view illustrating the lithium ion secondary battery 100 along line 4-4 shown in FIG. 1. FIGS. 5(A) and (B) are schematic cross-sectional views illustrating the lithium ion secondary battery 100 along line 5-5 shown in FIG. 2, with the electrolytic solution 10 and the power generating element 50 omitted. FIG. 6 is a cross-sectional view of the lithium ion secondary battery 100 along line 5-5 shown in FIG. 2.

Overall Structure of the Battery

As illustrated in FIGS. 4 and 5, the lithium ion secondary battery 100 according to the present embodiment comprises an electrolytic solution 10, and a power generating element 50 that contains electrolyte layers 20 and a plurality of positive electrodes 30 and negative electrodes 40 layered with each of the electrolyte layers 20 therebetween, and that expands with use in the layering direction Z of the positive electrodes 30 and the negative electrodes 40. The lithium ion secondary battery 100 further comprises an exterior member 110 forming a tightly sealed space 80 that in turn contains a space 60 in which the power generating element 50 is housed and an extra space 70. The extra space 70 is formed between the exterior member 110 and a side surface SS along the layering direction Z of the power generating element 50. The exterior member 110 is pressed against surfaces SU, SB, which intersect the layering direction Z of the power generating element 50, due to a pressure difference between the exterior and the interior. The exterior member 110 includes a volume adjustment portion 140 that allows for an increase in the volume of the extra space 70 by expanding in accordance with a pressure rise inside the tightly sealed space 80. The volume adjustment portion 140 allows for an increase in the volume of the extra space 70 while maintaining the state in which the exterior member 110 is pressed against the surfaces SU, SB intersecting the layering direction Z of the power generating element 50. Each of the component elements will be described in detail below.

Power Generating Element

The power generating element 50 is a laminated power generating element that includes electrolyte layers 20, and a plurality of positive electrodes 30 and negative electrodes 40 that are layered with each of the electrolyte layer 20 therebetween, as illustrated in FIG. 3. When the number of laminations of the positive electrodes 30 is d and the capacity of the battery is Q, it is preferable that $0.7 \leq Q/d \leq 5.0$ be satisfied. In the present embodiment, since a negative electrode 40 is disposed on the outermost layer of the power generating element 50, when the number of laminations of the positive electrodes 30 is d, the number of laminations of the negative electrodes 40 is d+1. In addition, in the case that a positive electrode 30 is disposed on the outermost layer of the power generating element 50, the number of laminations of the negative electrodes 40 may be set to d to satisfy $0.7 \leq Q/d \leq 5.0$.

The power generating element 50 comprises one surface SU intersecting the layering direction Z, another surface SB intersecting the layering direction Z, and a side surface SS along the layering direction Z, as illustrated in FIG. 4. The side surface SS along the layering direction Z is configured from the sequence of side surfaces of the electrolyte layers 20, the positive electrodes 30, and the negative electrodes 40, along the layering direction Z of the power generating element 50.

Positive Electrode

A positive electrode 30 is formed by positive electrode active material layers 32 being provided to a positive electrode current collector 31, as illustrated in FIG. 4.

The positive electrode current collector 31 is made of, for example, aluminum, and is formed into a thin film shape.

The positive electrode active material layer 32 is formed by applying and drying a positive electrode slurry, prepared by mixing the materials described below in a predetermined ratio, on both surfaces of the positive electrode current collector 31 such that a portion of the positive electrode current collector 31 is exposed. Furthermore, the dried positive electrode active material layers 32 are pressed from both sides of the positive electrode current collector 31, in a state of being bonded to both surfaces of the positive electrode current collector 31. A positive electrode tab 31a is joined to a portion of the positive electrode current collector 31 where the positive electrode active material layer 32 is not formed.

The positive electrode slurry contains a positive electrode active material, a conductive assistant, a binder, and a viscosity adjusting solvent. $LiNiCoAlO_2$ is used in a ratio of 90 wt % as the positive electrode active material. Acetylene black is used in a ratio of 5 wt % as the conductive assistant. PVDF is used in a ratio of 5 wt % as the binder.

Negative Electrode

A negative electrode 40 is formed by negative electrode active material layers 42 being provided to a negative electrode current collector 41.

The negative electrode current collector 41 is made of, for example, copper, and is formed into a thin film shape.

The negative electrode active material layer 42 is formed by applying and drying a negative electrode slurry, prepared by mixing the materials described below in a predetermined ratio, on both surfaces of the negative electrode current collector 41 such that a portion of the negative electrode current collector 41 is exposed. Furthermore, the dried negative electrode active material layers 42 are pressed from both sides of the negative electrode current collector 41, in a state of being bonded to both surfaces of the negative electrode current collector 41. A negative electrode tab 41a (refer to FIG. 1 and FIG. 2) is joined to a portion of the negative electrode current collector 41 where the negative electrode active material layer 42 is not formed.

The negative electrode slurry contains a negative electrode active material, a conductive assistant, a binder, and a viscosity adjusting solvent. A coated natural graphite is used in a ratio of 94 wt % as the negative electrode active material. Acetylene black is used in a ratio of 1 wt % as the conductive assistant. PVDF is used in a ratio of 5 wt % as the binder. NMP is used as a solvent for adjusting the viscosity of the slurry.

Electrolyte Layer

The electrolyte layer 20 comprises a separator impregnated with the electrolytic solution 10. The electrolyte layer 20 comprising the separator functions as a spatial partition (spacer) between the positive electrode 30 and the negative electrode 40. In addition, together with the above, the electrolyte layer also functions to hold the electrolyte, which is the transfer medium for lithium ions between the positive and negative electrodes at the time of charging and discharging.

The separator is not particularly limited, and a conventionally well-known separator may be appropriately used. Examples include nonwoven fabric separators and porous sheet separators made of polymers or fibers that absorb and hold the electrolyte.

Electrolytic Solution

A conventionally well-known electrolytic solution may be appropriately used as the electrolytic solution 10. In the present embodiment, the electrolytic solution is configured using a liquid electrolyte, but the electrolytic solution may be configured using a gel electrolyte.

A liquid electrolyte is obtained by lithium salt, which is a supporting salt, being dissolved in a solvent. Examples of the solvent include dimethyl carbonate (DMC), diethyl carbonate (DEC), dipropyl carbonate (DPC), ethyl methyl carbonate (EMC), methyl propionate (MP), methyl acetate (MA), methyl formate (MF), 4-methyldioxolane (4MeDOL), dioxolane (DOL), 2-methyltetrahydrofuran (2MeTHF), tetrahydrofuran (THF), dimethoxyethane (DME), ethylene carbonate (EC), propylene carbonate (PC), butylene carbonate (BC), and γ-butyrolactone (GBL). One of these solvents may be used alone, or two or more may be used in combination. While not particularly limited, examples of the supporting salt (lithium salt) include inorganic acid anionic salts such as $LiPF_6$, $LiBF_4$, $LiClO_4$, $LiAsF_6$, $LiTaF_6$, $LiSbF_6$, $LiAlCl_4$, $Li_2B_{10}Cl_{10}$, LiI, LiBr, LiCl, LiAlCl, $LiHF_2$, and LiSCN, and organic acid anionic salts such as $LiCF_3SO_3$, $Li(CF_3SO_2)_2N$, LiBOB (lithium bis oxide borate), LiBETI (lithium bis (perfluoroethanesulfonyl)imide; also written as $Li(C_2F_5SO_2)_2N$, and the like. These electrolyte salts may be used alone or in the form of a mixture of two or more.

Exterior Member

The exterior member 110 includes a first exterior member 120 and a second exterior member 130, which are joined to each other, as illustrated in FIG. 5(A). The exterior member 110 forms a tightly sealed space 80 inside the exterior member 110.

The first exterior member 120 and the second exterior member 130 are joined to each other by an end portion 120E of the first exterior member 120 being joined to an end portion 130E of the second exterior member 130. The tightly sealed space 80 is formed by the first exterior member 120 and the second exterior member 130 being joined to each other.

Figure 5B:
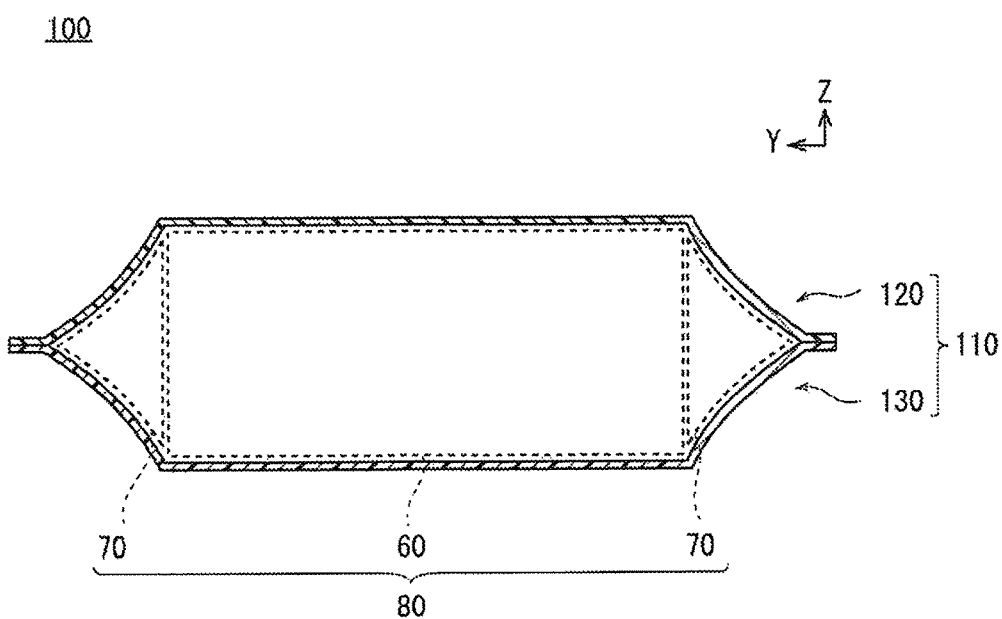

The tightly sealed space 80 is in a reduced pressure state. That is, the pressure inside the tightly sealed space 80 is lower than the pressure outside the tightly sealed space 80. The tightly sealed space 80 includes a space 60 in which the power generating element 50 is housed, and an extra space 70, as illustrated in FIG. 5(B).

The first exterior member 120 and the second exterior member 130 are joined in a state of sandwiching the power generating element 50 in the layering direction Z of the power generating element 50, as illustrated in FIG. 6.

The first exterior member 120 comprises an abutting portion 121 that abuts the surface SU intersecting the layering direction Z of the power generating element 50, a joint portion 122 that is joined to the second exterior member 130, and a connecting portion 123 that connects the abutting portion 121 and the joint portion 122.

The second exterior member 130 comprises an abutting portion 131 that abuts the surface SB intersecting the layering direction Z of the power generating element 50, a joint portion 132 that is joined to the first exterior member 120, and a connecting portion 133 that connects the abutting portion 131 and the joint portion 132.

The abutting portion 121 is pressed against the surface SU intersecting the layering direction Z of the power generating element 50, due to a pressure difference between the outside pressure and the inside pressure of the tightly sealed space 80 described above. The abutting portion 131 is similarly pressed against the surface SB intersecting the layering direction Z of the power generating element 50, due to said pressure difference.

An end portion 121E of the abutting portion 121 abuts an end portion E1 of the surface SU intersecting the layering direction Z of the power generating element 50. An end portion 131E of the abutting portion 131 abuts an end portion E2 of the surface SB intersecting the layering direction Z of the power generating element 50.

The joint portion 122 and the joint portion 132 are joined and have a predetermined width.

The connecting portion 123 connects the end portion 121E of the abutting portion 121 and the joint portion 122. The connecting portion 133 connects the end portion 131E of the abutting portion 131 and the joint portion 132.

The extra space 70 is formed between the connecting portion 123 and the connecting portion 133 of the exterior member 110 and the side surface SS along the layering direction of the power generating element 50. The extra space 70 is disposed surrounding the power generating element 50.

The first exterior member 120 and the second exterior member 130 include a volume adjustment portion 140 that allows for an increase in the volume of the extra space 70 by expanding in accordance with a pressure rise inside the tightly sealed space 80. The volume adjustment portion 140 allows for an increase in the volume of the extra space 70 while maintaining the state in which the exterior member 110 is pressed against the surfaces SU, SB intersecting the layering direction Z of the power generating element 50. In the present embodiment, the volume adjustment portion 140 is configured by forming a loose portion in parts of the connecting portion 123 and the connecting portion 133.

In the present embodiment, the ratio Vl/Va of the volume Vl of the power generating element 50 (volume of the space 60 in which the power generating element 50 is housed) Vl relative to the volume Va of the tightly sealed space 80 is set within a predetermined range. Specifically, the ratio of the volume Vl of the power generating element 50 relative to the volume Va of the tightly sealed space 80 is set to $0.800 \leq Vl/Va \leq 0.995$. The volume Va of the tightly sealed space 80 can be measured using Archimedes's method. In addition, in the present embodiment, the volume Vl of the power generating element 50 is obtained by multiplying the area of the negative electrode 40 by the thickness of the power generating element 50.

In the present embodiment, the first exterior member 120 and the second exterior member 130 are each configured by a laminated sheet with a three-layer structure. The first layer corresponds to a thermal adhesive resin and is formed using, for example, polyethylene (PE), ionomer, or ethylene vinyl acetate (EVA). The material of the first layer is placed adjacent to the negative electrode 40. The second layer corresponds to a metal formed into a foil; for example, an Al foil or a Ni foil is used. The third layer corresponds to a resin film; for example, rigid polyethylene terephthalate (PET) or nylon is used. The material of the third layer is placed adjacent to the positive electrode 30.

In the lithium ion secondary battery 100 according to the present embodiment, the sealing of the electrolytic solution 10 and the power generating element 50 by the first exterior member 120 and the second exterior member 130 is carried out with the following procedure.

First, a portion of the perimeter of the first exterior member 120 and the second exterior member 130 is opened, and the rest of the perimeter is sealed by thermal welding, or the like. At this time, the joint portion 122 and the joint portion 132 are joined to each other.

Next, an electrolytic solution is injected from the opened portion of the first exterior member 120 and the second exterior member 130 to impregnate the electrolyte layer 20 with the electrolytic solution.

Then, the interior of the first exterior member 120 and the second exterior member 130 is decompressed from the opened portion to release the air, and the opened portion is also thermally fused and completely sealed.

With the procedure described above, the electrolytic solution 10 and the power generating element 50 are sealed in a depressurized state by the first exterior member 120 and the second exterior member 130.

Figure 8:
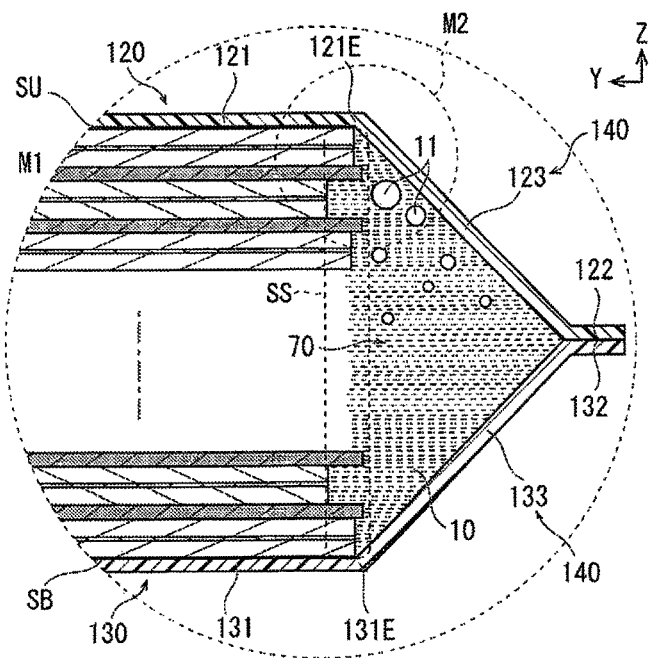
FIG. 8 is an enlarged view for explaining the operation of the volume adjustment portion of the lithium ion secondary battery, corresponding to the portion surrounded by the broken line portion M1 of FIG. 6, showing the volume adjustment portion while the volume of the extra space is being increased.
Figure 9:
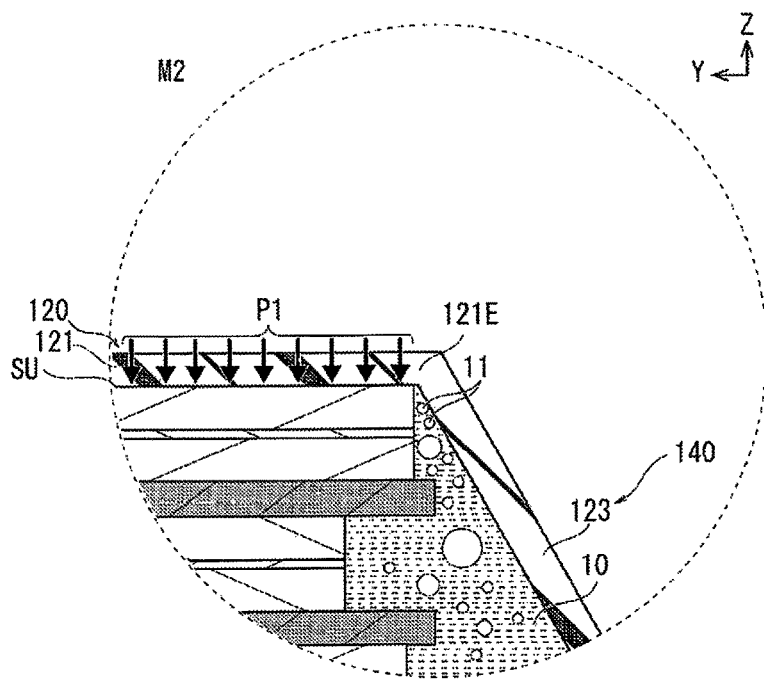
FIG. 9 is an enlarged view for explaining the operation of the volume adjustment portion of the lithium ion secondary battery, corresponding to the portion surrounded by the broken line portion M2 of FIG. 8.

Next, the operation of the lithium ion secondary battery 100 according to the present embodiment will be described with reference to FIGS. 7-9.

Figure 7:
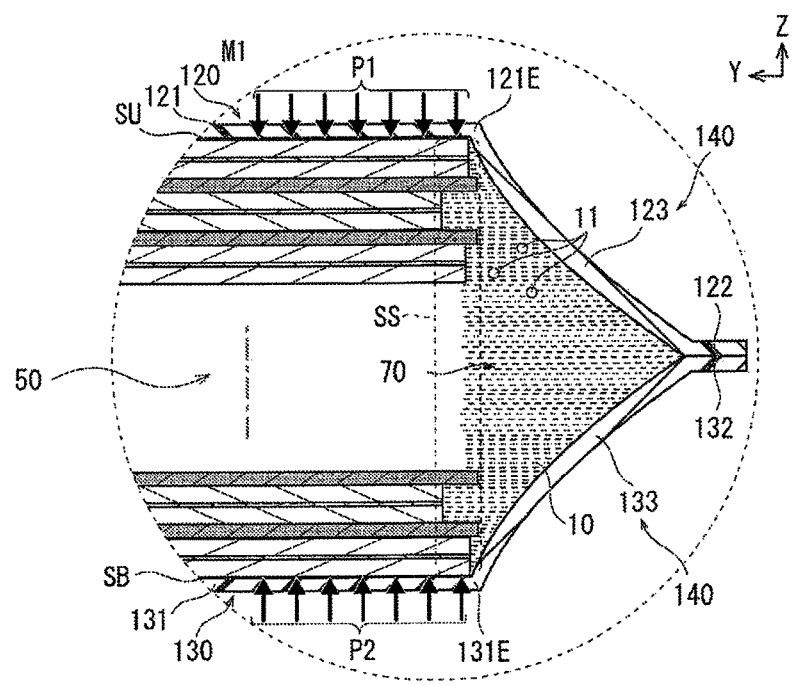
FIG. 7 is an enlarged view for explaining the operation of the volume adjustment portion of the lithium ion secondary battery, corresponding to the portion surrounded by the broken line portion M1 of FIG. 6, showing the volume adjustment portion before the volume of the extra space is increased.

FIG. 7 is an enlarged view for explaining the operation of the volume adjustment portion 140 of the lithium ion secondary battery 100, corresponding to the portion surrounded by the broken line portion M1 of FIG. 6, showing the volume adjustment portion 140 before the volume of the extra space 70 is increased. FIG. 8 is an enlarged view for explaining the operation of the volume adjustment portion 140 of the lithium ion secondary battery 100, corresponding to the portion surrounded by the broken line portion M1 of FIG. 6, showing the volume adjustment portion 140 while the volume of the extra space 70 is being increased. FIG. 9 is an enlarged view for explaining the operation of the volume adjustment portion 140 of the lithium ion secondary battery 100, corresponding to the portion surrounded by the broken line portion M2 of FIG. 8.

The lithium ion secondary battery 100 according to the present embodiment is repeatedly charged and discharged as a driving power source or an auxiliary power source of a motor, or the like, of vehicles, such as fuel cell vehicles and hybrid electric vehicles.

As charging and discharging are repeatedly carried out, the positive electrode 30 or the negative electrode 40 reacts with the electrolytic solution 10 to generate gas 11 inside the power generating element 50.

The gas 11 is moved to the extra space 70 formed between the exterior member 110 and the side surface SS along the layering direction Z of the power generating element 50, as illustrated in FIG. 7.

At this time, in the present embodiment, the ratio V1/Va of the volume V1 of the power generating element relative to the volume Va of the tightly sealed space 80 before use is less than or equal to 0.995. Thus, the volume of the extra space 70 is larger than a predetermined value before use. As a result, even if the gas 11 is moved to the extra space 70, the pressure inside the tightly sealed space 80 will not immediately rise.

The volume adjustment portion 140 is in a relaxed state while the amount of gas 11 that has moved to the extra space 70 is small. Thereafter, when the amount of gas 11 that has moved to the extra space 70 increases, the volume adjustment portion 140 changes to a stretched state, as illustrated in FIG. 8. A rise in the pressure inside the tightly sealed space 80, which occurs due to the gas 11 moving to the extra space 70, is thereby suppressed. Thus, the movement of the gas 11 that is generated inside the power generating element 50 is prevented from being obstructed by an increase in the pressure of the tightly sealed space 80. As a result, the movement of the gas 11 that is generated inside the power generating element 50 is promoted, and an occurrence of liquid depletion due to the gas 11 remaining inside the power generating element 50 is prevented. In addition, the power generating element 50 can expand in the layering direction Z with use. When the power generating element 50 expands in the layering direction Z, the volume adjustment portion 140 changes to a stretched state, in the same manner as the case in which the gas 11 moves, as described above with reference to FIG. 8. A rise in the pressure inside the tightly sealed space 80, which occurs due to the power generating element 50 expanding in the layering direction Z, is thereby suppressed. As a result, the occurrence of liquid depletion is also prevented even when the power generating element 50 expands.

Additionally, the exterior member 110 is pressed against surfaces SU, SB intersecting the layering direction Z of the power generating element 50, due to a pressure difference between the outside space and the tightly sealed space 80. As a result, pressures P1, P2 from the exterior member 110 are uniformly applied to the surfaces SU, SB intersecting the layering direction Z of the power generating element 50 (refer to FIG. 7).

Then, the volume adjustment portion 140 allows for an increase in the volume of the extra space 70 while maintaining the state in which the exterior member 110 is pressed against the surfaces SU, SB intersecting the layering direction Z of the power generating element 50. As a result, a gap is prevented from being formed between the exterior member 110 and the surfaces SU, SB intersecting the layering direction Z of the power generating element 50. Thus, gas 11 is prevented from entering between the exterior member 110 and the surface SU intersecting the layering direction Z of the power generating element 50, as illustrated in FIG. 9. In addition, while not shown, gas 11 is similarly prevented from entering between the exterior member 110 and the surface SB intersecting the layering direction Z of the power generating element 50. As a result, a state in which pressures P1, P2 from the exterior member 110 are uniformly applied to the surfaces SU, SB intersecting the layering direction Z of the power generating element 50 is maintained.

Action and Effects

The lithium ion secondary battery 100 according to the present embodiment comprises an electrolytic solution 10, and a power generating element 50 that contains electrolyte layers 20 and a plurality of positive electrodes 30 and negative electrodes 40 layered with each of the electrolyte layers 20 therebetween, and that expands with use in the layering direction Z of the positive electrodes 30 and the negative electrodes 40. In addition, the lithium ion secondary battery 100 comprises an exterior member 110 forming a tightly sealed space 80 containing a space 60 in which the power generating element 50 is housed, and an extra space 70. The extra space 70 is formed between the exterior member 110 and a side surface SS along the layering direction Z of the power generating element 50. The exterior member 110 includes a volume adjustment portion 140 allowing for an increase in the volume of the extra space 70 by expanding in response to a pressure rise inside the tightly sealed space 80 while the exterior member is being pressed against the surfaces SU, SB intersecting the layering direction Z of the power generating element 50 due to a pressure difference between the exterior and the interior. The volume adjustment portion 140 allows for an increase in the volume of the extra space 70 while maintaining the state in which the exterior member 110 is pressed against the surfaces SU, SB intersecting the layering direction Z of the power generating element 50.

According to such a configuration, an increase in the volume of the extra space 70 corresponding to a pressure rise inside the tightly sealed space 80 is permitted by the volume adjustment portion 140. A rise in the pressure inside the tightly sealed space 80, which occurs due to gas 11 generated in the power generating element 50 moving to the extra space 70, is thereby suppressed. Thus, it becomes possible to smoothly move the gas 11 generated inside the power generating element 50 to the extra space 70. In addition, the volume adjustment portion 140 allows for an increase in the volume of the extra space 70 while maintaining the state in which the exterior member 110 is pressed against the surfaces SU, SB intersecting the layering direction Z of the power generating element 50. As a result, a gap is prevented from forming between the exterior member 110 and the surfaces SU, SB intersecting the layering direction Z of the power generating element 50. Thus, it becomes difficult for a part of the gas 11 that has moved to the extra space 70 to enter between the exterior member 110 and the surfaces SU, SB intersecting the layering direction Z of the power generating element 50. Therefore, it is possible to provide a lithium ion secondary battery 100 that is capable of preventing liquid depletion while maintaining a state in which pressure from the exterior member 110 acts uniformly on surfaces SU, SB intersecting the layering direction Z of the power generating element 50.

In addition, in the lithium ion secondary battery 100 according to the present embodiment, the ratio of the volume V1 of the power generating element relative to the volume Va of the tightly sealed space 80 before use satisfies $0.800 \leq V1/Va \leq 0.995$.

According to such a configuration, since V1/Va is less than or equal to 0.995 before use, the volume of the extra space 70 is larger than a predetermined value. As a result, a rise in the pressure inside the tightly sealed space 80, which occurs due to the gas 11 generated in the power generating element 50 moving to the extra space 70, is further alleviated. Thus, it becomes possible to more reliably carry out a smooth movement of the gas 11 generated inside the power generating element 50 to the extra space 70.

Additionally, since Vl/Va is greater than or equal to 0.800 before use, the volume of the extra space 70 is smaller than a predetermined value. As a result, it becomes possible more reliably to prevent a gap from forming between the exterior member 110 and the surfaces SU, SB intersecting the layering direction Z of the power generating element 50, caused by a significant change in the shape of the extra space 70. Thus, it becomes possible more reliably to prevent a part of the gas 11 that has moved to the extra space 70 from entering between the exterior member 110 and the surfaces SU, SB intersecting the layering direction Z of the power generating element 50.

Additionally, in the lithium ion secondary battery 100 according to the present embodiment, the extra space 70 is disposed surrounding the power generating element 50.

According to such a configuration, the average movement distance of the gas 11 generated inside the power generating element 50 with respect to the extra space 70 becomes small. As a result, it becomes possible to even more reliably carry out a smooth movement of the gas 11 generated inside the power generating element 50 to the extra space 70.

In addition, in the lithium ion secondary battery 100 according to the present embodiment, the positive electrodes 30 and the negative electrodes 40 are electrode plates having a rectangular shape. The aspect ratio of the electrode plates that constitute the positive electrodes 30 and the negative electrodes 40 is 1 to 3.

According to such a configuration, the aspect ratio of the lithium ion secondary battery 100 can be adjusted in accordance with the space in which the lithium ion secondary battery 100 is mounted. As a result, the utilization efficiency of the space in which the lithium ion secondary battery 100 is mounted is improved.

Modified Example of the First Embodiment

In the lithium ion secondary battery 100 according to the first embodiment, the volume adjustment portion 140 allows for an increase in the volume of the extra space 70 by the connecting portion 123 and the connecting portion 133 changing from a loose state to a stretched state. However, the configuration of the volume adjustment portion 140 may be changed as long as the configuration can allow for an increase in the volume of the extra space 70 while maintaining the state in which the exterior member 110 is pressed against the surfaces SU, SB intersecting the layering direction Z of the power generating element 50.

For example, as the volume adjustment portion 140, an expandable portion may be formed in the connecting portion 123 and the connecting portion 133.

Figure 10:
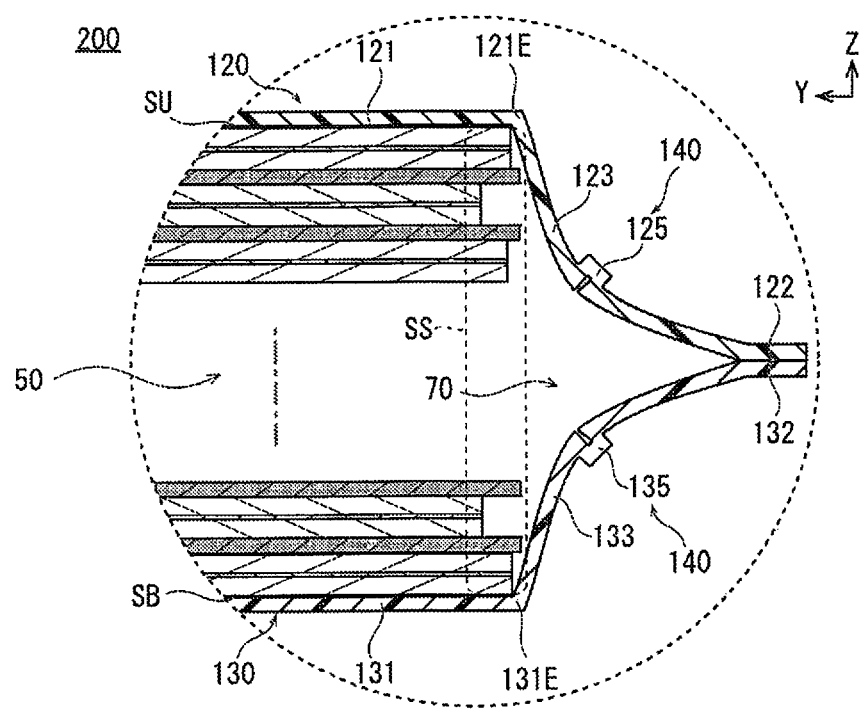
FIG. 10 is an enlarged view illustrating the volume adjustment portion of the lithium ion secondary battery according to a modified example of the first embodiment, corresponding to the portion surrounded by the broken line portion M1 of FIG. 6.
Figure 11:
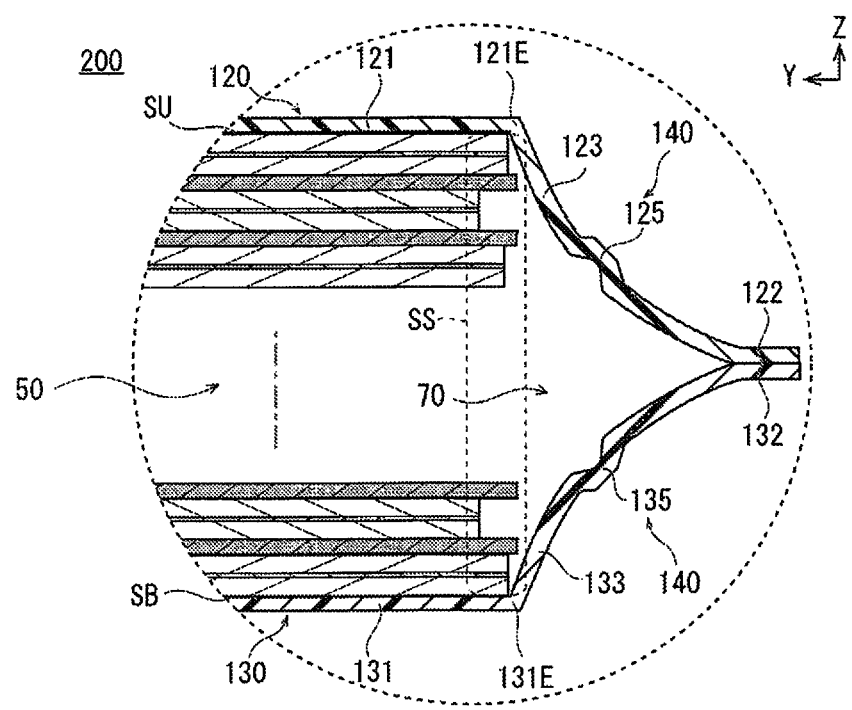
FIG. 11 is an enlarged view illustrating the volume adjustment portion of the lithium ion secondary battery, corresponding to the portion surrounded by the broken line portion M1 of FIG. 6, showing the volume adjustment portion while the volume of the extra space is being increased.

FIG. 10 is an enlarged view illustrating the volume adjustment portion 140 of a lithium ion secondary battery 200 according to the present modified example, corresponding to the portion surrounded by the broken line portion M1 of FIG. 6. FIG. 11 is an enlarged view illustrating the volume adjustment portion 140 of the lithium ion secondary battery 200 according to the present modified example, corresponding to the portion surrounded by the broken line portion M1 of FIG. 6, showing the volume adjustment portion 140 while the volume is being adjusted.

In the lithium ion secondary battery 200 according to the present modified example, an expandable portion 125 is formed in the connecting portion 123 as the volume adjustment portion 140, as illustrated in FIG. 10. Additionally, an expandable portion 135 is formed in the connecting portion 133 as the volume adjustment portion 140.

The expandable portions 125, 135 expand as the amount of gas 11 that has moved to the extra space 70 increases, as illustrated in FIG. 11. A rise in the pressure inside the tightly sealed space 80, which occurs due to gas 11 generated in the power generating element 50 moving to the extra space 70, is thereby more reliably suppressed. As a result, it becomes possible to even more reliably carry out a smooth movement of the gas 11 generated inside the power generating element 50 to the extra space 70.

Second Embodiment

The lithium ion secondary battery 300 according to the second embodiment is different from the lithium ion secondary battery 100 according to the first embodiment in the following feature.

That is, in the lithium ion secondary battery 100 according to the first embodiment, the ratio of the volume Vl of the power generating element 50 relative to the volume Va of the tightly sealed space 80 is regulated within a predetermined range.

On the other hand, the lithium ion secondary battery 300 according to the second embodiment is different from the lithium ion secondary battery 100 according to the first embodiment in that the angle formed between the connecting portion of the exterior member and a direction Y that intersects the layering direction Z of the power generating element 50 is regulated.

The configuration according to the above-described difference will be described below. However, configurations that are the same as the configuration of the lithium ion secondary battery 100 according to the first embodiment will be given the same reference symbols and descriptions thereof will be omitted.

Figure 12A:
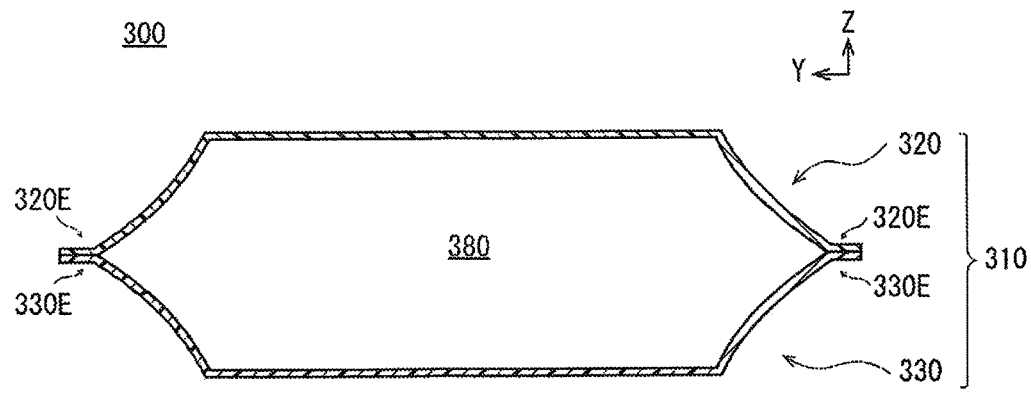
FIGS. 12A and 12B are schematic cross-sectional views corresponding to FIG. 5, illustrating the lithium ion secondary battery according to the second embodiment.
Figure 13:
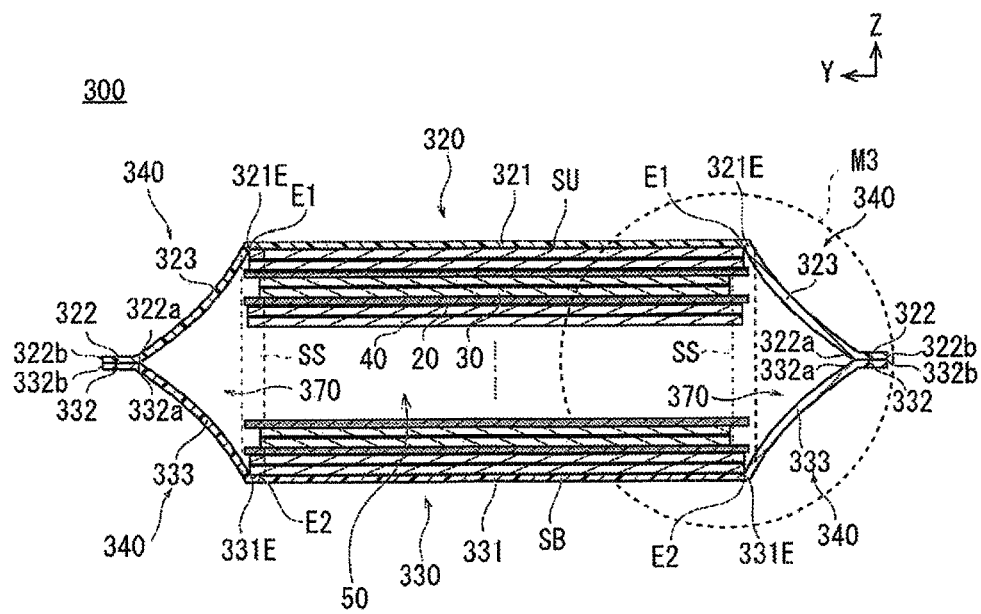
FIG. 13 is a cross-sectional view corresponding to FIG. 6, illustrating the lithium ion secondary battery.
Figure 14:
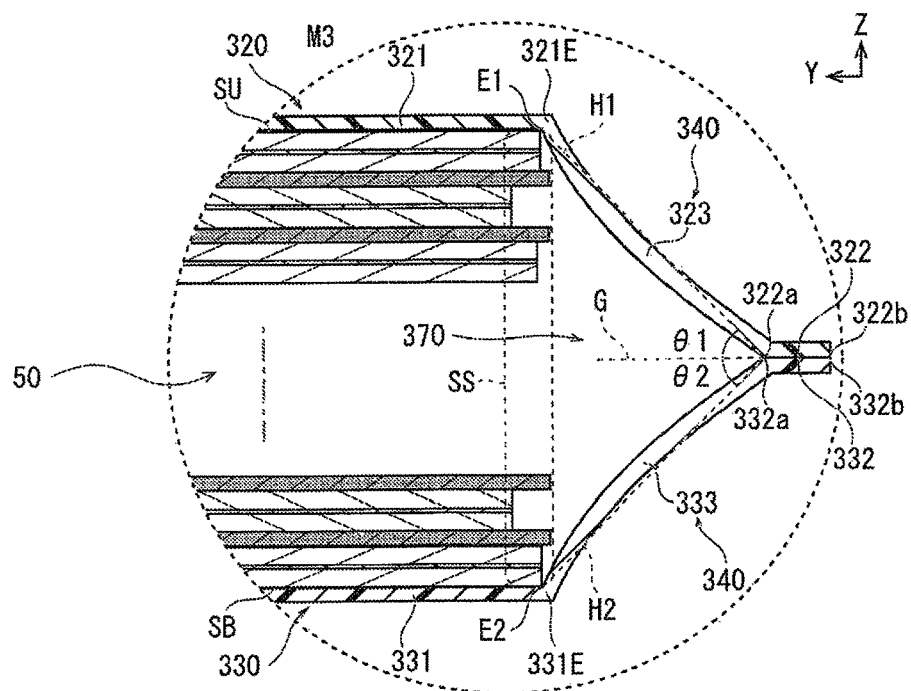
FIG. 14 is an enlarged view illustrating the volume adjustment portion of the lithium ion secondary battery, corresponding to the portion surrounded by the broken line portion M3 of FIG. 13.

FIGS. 12(A) and (B) are schematic cross-sectional views corresponding to FIGS. 5(A) and (B). FIG. 13 is a cross-sectional view corresponding to FIG. 6, illustrating the lithium ion secondary battery 300 according to the present embodiment. FIG. 14 is an enlarged view illustrating the volume adjustment portion 340 of the lithium ion secondary battery 300 according to the present embodiment, corresponding to the portion surrounded by the broken line portion M3 of FIG. 13.

As illustrated in FIGS. 12 and 13, the lithium ion secondary battery 300 according to the present embodiment comprises an electrolytic solution 10 (not shown), and a power generating element 50 that contains electrolyte layers 20 and a plurality of positive electrodes 30 and negative electrodes 40 layered with each of the electrolyte layers 20 therebetween, and that expands with use in the layering direction Z of the positive electrodes 30 and the negative electrodes 40. The lithium ion secondary battery 300 further comprises an exterior member 310 forming a tightly sealed space 380 containing a space 360 in which the power generating element 50 is housed, and an extra space 370. The extra space 370 is formed between the exterior member 310 and a side surface SS along the layering direction Z of the power generating element 50. The exterior member 310 is pressed against surfaces SU, SB intersecting the layering direction Z of the power generating element 50, due to a pressure difference between the exterior and the interior. The exterior member 310 includes a volume adjustment portion 340 that allows for an increase in the volume of the extra space 370 by expanding in accordance with a pressure rise inside the tightly sealed space 380. The volume adjustment portion 340 allows for an increase in the volume of the extra space 370 while maintaining the state in which the exterior member 310 is pressed against the surfaces SU, SB intersecting the layering direction Z of the power generating element 50.

The configuration of the lithium ion secondary battery 300 according to the present embodiment is the same as the configuration of the lithium ion secondary battery 100 according to the first embodiment, except that the configuration of the exterior member 310 is different from the configuration of the exterior member 110 of the lithium ion secondary battery 100 according to the first embodiment. Thus, descriptions of the configurations other than the exterior member 310 are omitted.

Exterior Member

The exterior member 310 includes a first exterior member 320 and a second exterior member 330, which are joined to each other, as illustrated in FIG. 12(A). The exterior member 310 forms a tightly sealed space 380 inside the exterior member 310.

The first exterior member 320 and the second exterior member 330 are joined to each other by an end portion 320E of the first exterior member 320 being joined to an end portion 330E of the second exterior member 330. The tightly sealed space 380 is formed by the first exterior member 320 and the second exterior member 330 being joined to each other.

Figure 12B:
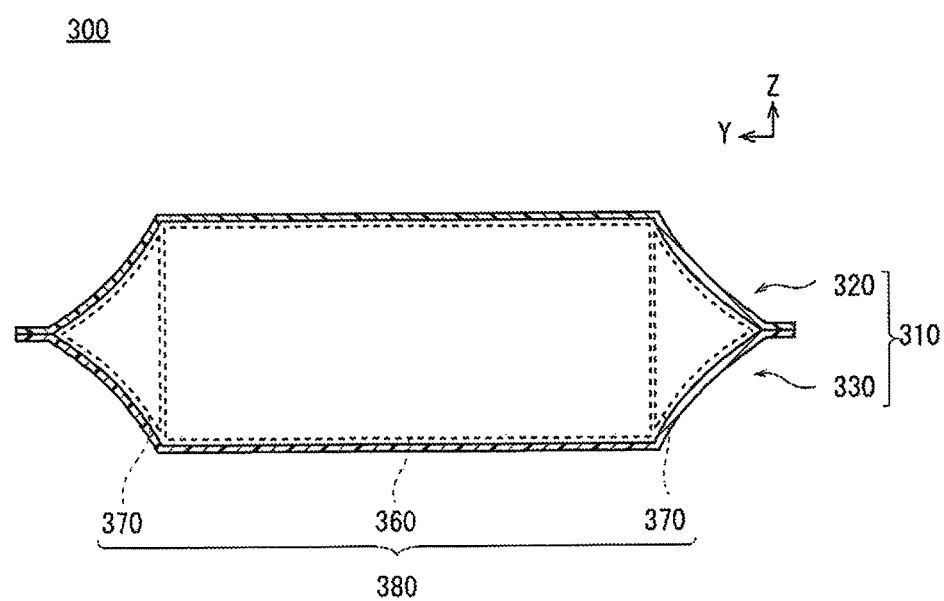

The tightly sealed space 380 is in a reduced pressure state. That is, the pressure inside the tightly sealed space 380 is lower than the pressure outside the tightly sealed space 380. The tightly sealed space 380 includes a space 360 in which the power generating element 50 is housed, and an extra space 370, as illustrated in FIG. 12(B).

The first exterior member 320 and the second exterior member 330 are joined in a state of sandwiching the power generating element 50 in the layering direction Z of the power generating element 50, as illustrated in FIG. 13.

The first exterior member 320 comprises an abutting portion 321 that abuts the surface SU intersecting the layering direction Z of the power generating element 50, a joint portion 322 that is joined to the second exterior member 330, and a connecting portion 323 that connects the abutting portion 321 and the joint portion 322.

The second exterior member 330 comprises an abutting portion 331 that abuts the surface SB intersecting the layering direction Z of the power generating element 50, a joint portion 332 that is joined to the first exterior member 320, and a connecting portion 333 that connects the abutting portion 331 and the joint portion 332.

The abutting portion 321 is pressed against the surface SU intersecting the layering direction Z of the power generating element 50, due to a pressure difference between the outside pressure and the inside pressure of the tightly sealed space 380 described above. The abutting portion 331 is similarly pressed against the surface SB intersecting the layering direction Z of the power generating element 50, due to said pressure difference.

The end portion 321E of the abutting portion 321 abuts an end portion E1 of the surface SU intersecting the layering direction Z of the power generating element 50. The end portion 331E of the abutting portion 331 abuts an end portion E2 of the surface SB intersecting the layering direction Z of the power generating element 50.

The joint portion 322 and the joint portion 332 are joined, provided with a predetermined width.

The joint portion 322 comprises a first end portion 322a, which is disposed at a boundary between a portion of the first exterior member 320 that is joined to the second exterior member 330 and a portion that is not joined to the second exterior member 330, and a second end portion 322b that is different from the first end portion 322a.

The joint portion 332 comprises a first end portion 332a, which is disposed at a boundary between a portion of the second exterior member 330 that is joined to the first exterior member 320 and a portion that is not joined to the first exterior member 320, and a second end portion 332b that is different from the first end portion 332a.

In the exterior member 110, at locations where the positive electrode tab 31a (negative electrode tab 41a) is taken out from the inside to the outside of the lithium ion secondary battery 300, the first exterior member 320 and the second exterior member 330 are joined via the positive electrode current collector 31 (negative electrode current collector 41) and the positive electrode tab 31a (negative electrode tab 41a) (refer to FIG. 4). In these locations, the boundary between the portion joined to the positive electrode current collector 31 (negative electrode current collector 41) or the positive electrode tab 31a (negative electrode tab 41a) and the portion not joined to the positive electrode current collector 31 (negative electrode current collector 41) or the positive electrode tab 31a (negative electrode tab 41a) corresponds to the first end portion 322a, 332a.

The connecting portion 323 connects the end portion 321E of the abutting portion 321 and the first end portion 322a of the joint portion 322. The connecting portion 333 connects the end portion 331E of the abutting portion 331 and the first end portion 332a of the joint portion 332.

The extra space 370 is formed between the connecting portion 323 and the connecting portion 333 and the side surface SS along the layering direction of the power generating element 50. The extra space 370 is disposed surrounding the power generating element 50.

The first exterior member 320 and the second exterior member 330 include a volume adjustment portion 340 that allows for an increase in the volume of the extra space 370 by expanding in accordance with a pressure rise inside the tightly sealed space 380. The volume adjustment portion 340 allows for an increase in the volume of the extra space 370 while maintaining the state in which the exterior member 310 is pressed against the surface SU intersecting the layering direction Z of the power generating element 50. In the present embodiment, the volume adjustment portion 340 is configured by forming a loose portion in parts of the connecting portion 323 and the connecting portion 333.

In the present embodiment, the angle formed by the connecting portions 323, 333 and the direction Y intersecting the layering direction Z of the power generating element 50 is regulated within a predetermined range. Specifically, the angle $\theta 1$ ($\theta 2$) formed by the straight line H1 (H2) that connects the end portion E1 (E2) of the surface SU (SB) intersecting the layering direction Z of the power generating element 50 and the first end portion 322a (332a) of the joint portion 322 (332), and the straight line G intersecting the layering direction Z of the power generating element 50, satisfies $15° \leq \theta 1 (\theta 2) \leq 62°$, as illustrated in FIG. 14. In FIG. 14, the straight line G extends along the direction Y, which intersects the layering direction Z of the power generating element 50. $\theta 1$ and $\theta 2$ can be measured by a geometric method using, for example, a cross-sectional image of the lithium ion secondary battery 300 acquired using an X-ray CT device. The average value θa of θ1 and θ2=(θ1+θ2)/2 may be set in a range of 15°≤θa≤62°, giving consideration to measurement errors of θ1 and θ2.

Next, the operation of the lithium ion secondary battery 300 according to the present embodiment will be described, with reference to FIG. 15.

Figure 15:
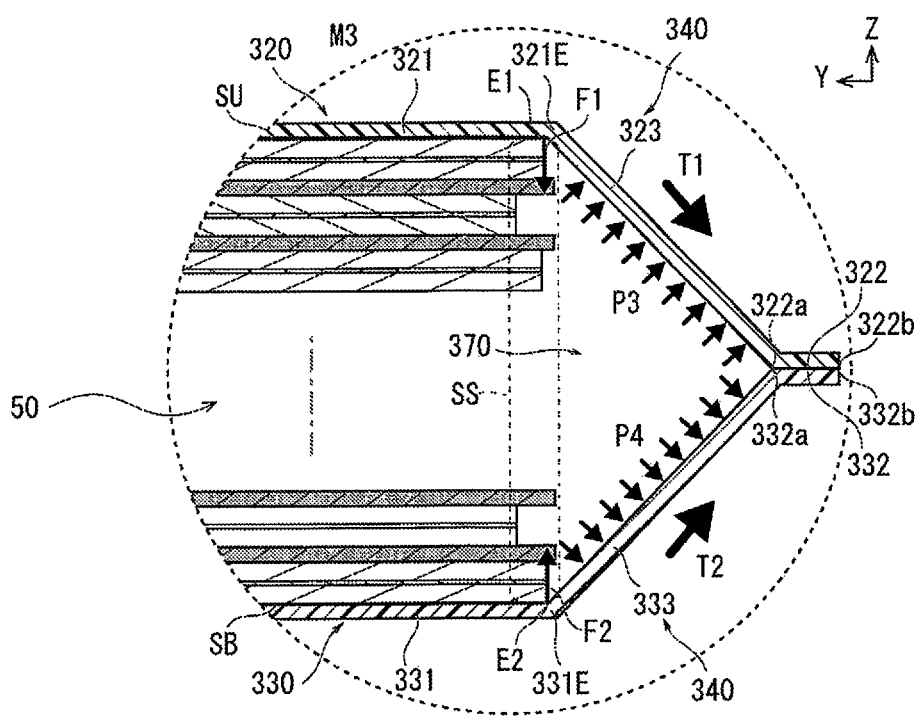
FIG. 15 is an enlarged view illustrating the volume adjustment portion of the lithium ion secondary battery, corresponding to the portion surrounded by the broken line portion M3 of FIG. 13, showing the volume adjustment portion while the volume of the extra space is being increased.

FIG. 15 is an enlarged view illustrating the volume adjustment portion 340 of the lithium ion secondary battery 300, corresponding to the portion surrounded by the broken line portion M3 of FIG. 13, showing the volume adjustment portion 340 while the volume of the extra space 370 is being increased. In FIG. 15, the electrolytic solution 10 and the gas 11 are omitted.

As described above in the first embodiment, gas 11 is generated inside the power generating element 50 by repeated charging and discharging of the lithium ion secondary battery 300. Then, the gas 11 that is generated inside the power generating element 50 moves to the extra space 370.

If the amount of gas 11 that has moved to the extra space 370 increases, pressure P3 (P4) acts on the connecting portion 323 (333) from the electrolytic solution 10 that is housed in the extra space 370. As a result, the connecting portion 323 (333) is stretched, and tensile force T1 (T2) is generated in the connecting portion 323 (333).

Then, due to the tensile force T1 (T2) generated in the connecting portion 323 (333), a force F1 (F2) acts to press the end portion 321E (331E) of the abutting portion 321 (331) against the end portion E1 (E2) of the surface SU (SB) intersecting the layering direction Z of the power generating element 50.

The force F1 (F2) becomes weaker as the angle θ1 (θ2), which is formed by the straight line H1 (H2) that connects the end portion E1 (E2) of the surface SU (SB) and the joint portion 322 (332) of the first exterior member 320 and the second exterior member 330 and by the direction Y that intersects the layering direction Z of the power generating element 50, becomes smaller.

Here, in the lithium ion secondary battery 300 according to the present embodiment, θ1 (θ2) is less than or equal to 62°. Thus, by the end portion 321E (331E) of the abutting portion 321 (331) being strongly pressed against the end portion E1 (E2) of the surface SU (SB) intersecting the layering direction Z of the power generating element 50, the shape of the power generating element 50 is prevented from changing.

Action and Effects

According to the lithium ion secondary battery 300 of the present embodiment, the exterior member 310 includes a first exterior member 320 and a second exterior member 330, which are joined to each other. In the first exterior member 320 and the second exterior member 330, an end portion 320E of the first exterior member 320 is joined to an end portion 330E of the second exterior member 330, in a state of sandwiching the power generating element 50 in the layering direction Z of the power generating element 50. The angle θ1 (θ2), which is formed by the straight line H1 (H2) that connects the end portion E1 (E2) of the surface SU (SB) intersecting the layering direction Z of the power generating element 50 and the joint portion 322 (332) of the first exterior member 320 and the second exterior member 330 and by the direction Y that intersects the layering direction Z of the power generating element 50 before use, satisfies 15°≤θ1 (θ2)≤62°.

According to such a configuration, since θ1 (θ2) is less than or equal to 62°, of the force that acts on the abutting portion 321 (331) from the connecting portion 323 (333), the force in the layering direction Z of the power generating element 50 becomes weaker. As a result, it is possible to prevent the shape of the power generating element 50 from being changed, due to a force in the layering direction Z acting on the power generating element 50 from the exterior member 310. As a result, a state in which pressures P1, P2 from the exterior member 110 are uniformly applied to the surfaces SU, SB intersecting the layering direction Z of the power generating element 50 is more reliably maintained.

In addition, the volume of the extra space 70 decreases as θ1 (θ2) increases. Then, the utilization efficiency of the space for mounting the lithium ion secondary battery 300 according to the present embodiment becomes higher as the volume of the extra space 70 becomes smaller. In the present embodiment, since θ1 (θ2) is greater than or equal to 15°, the utilization efficiency of the space for mounting the lithium ion secondary battery 300 according to the present embodiment is high.

Third Embodiment

The lithium ion secondary battery 400 according to the third embodiment is different from the lithium ion secondary battery 300 according to the second embodiment in the following feature.

That is, in the lithium ion secondary battery 300 according to the second embodiment, the portions where the first exterior member 320 and the second exterior member 330 are joined (joint portion 322, 332) are disposed between one outermost surface (surface SU in FIG. 13) and the other outermost surface (surface SB in FIG. 13) of the power generating element 50 in the layering direction Z.

On the other hand, the lithium ion secondary battery 400 according to the third embodiment is different from the lithium ion secondary battery 300 according to the second embodiment in that the portions where the first exterior member and the second exterior member are joined are disposed on the same outermost surface of the power generating element 50 in the layering direction Z.

The configuration according to the above-described difference will be described below. However, configurations that are the same as the configuration of the lithium ion secondary battery 300 according to the second embodiment will be given the same reference symbols and descriptions thereof will be omitted.

Figure 16:
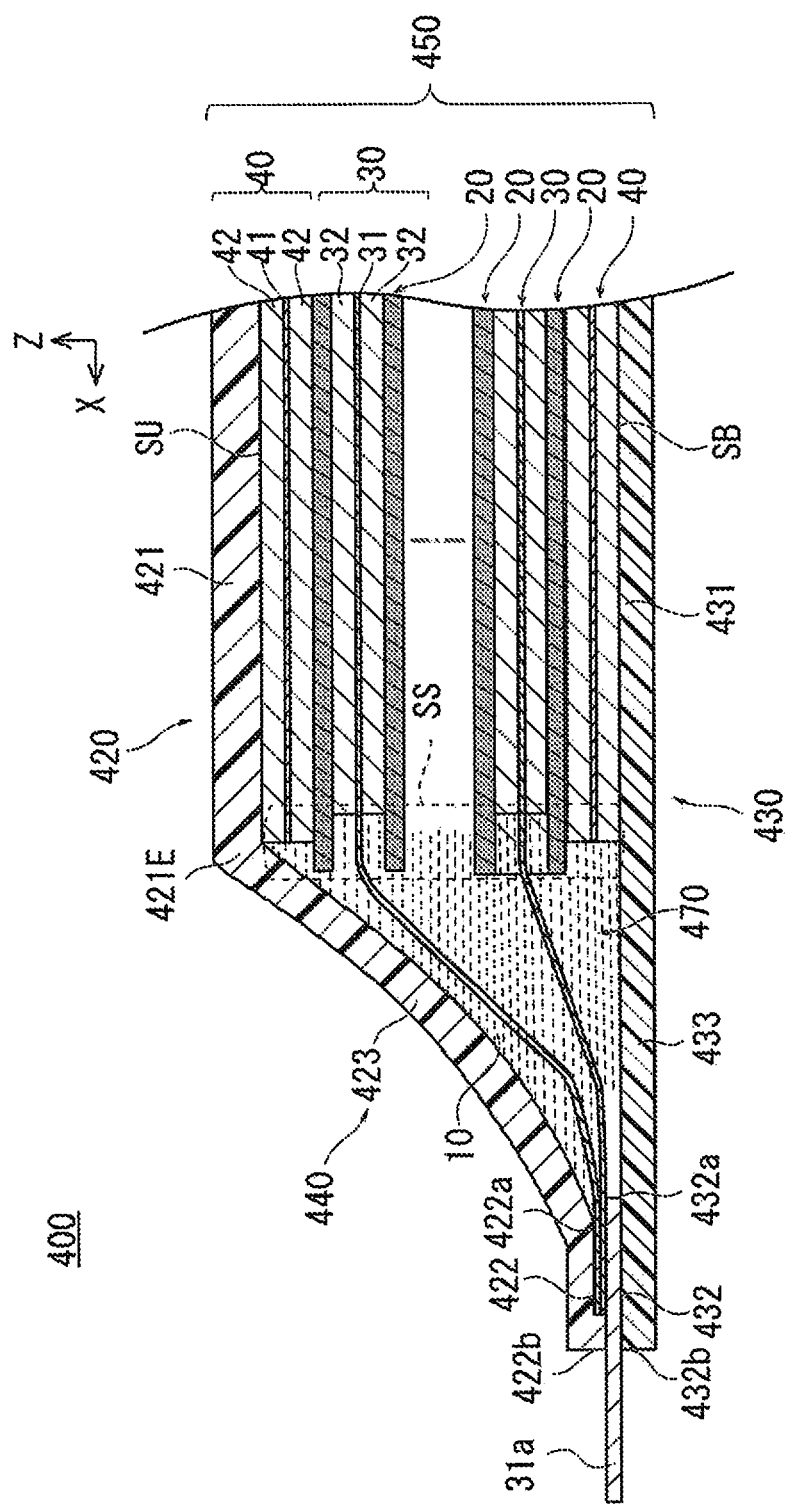
FIG. 16 is a partial end surface view corresponding to FIG. 4, illustrating the lithium ion secondary battery according to the third embodiment.
Figure 17A:
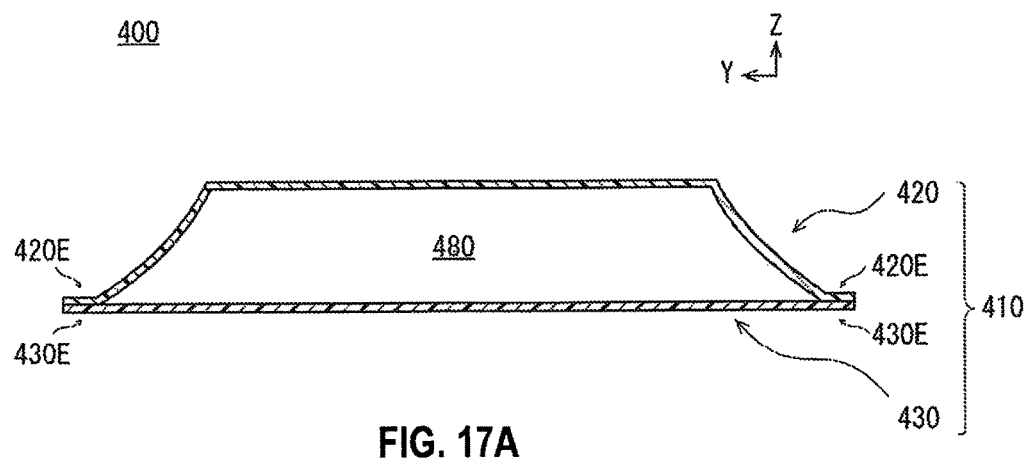
FIGS. 17A and 17B are schematic cross-sectional views corresponding to FIG. 5, illustrating the lithium ion secondary battery.
Figure 18:
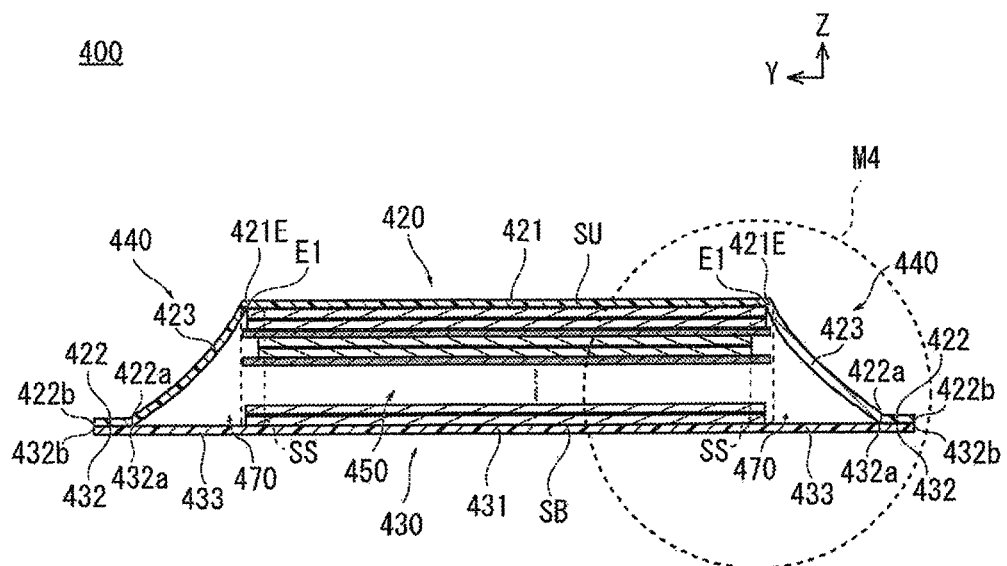
FIG. 18 is a cross-sectional view corresponding to FIG. 6, illustrating the lithium ion secondary battery.
Figure 19:
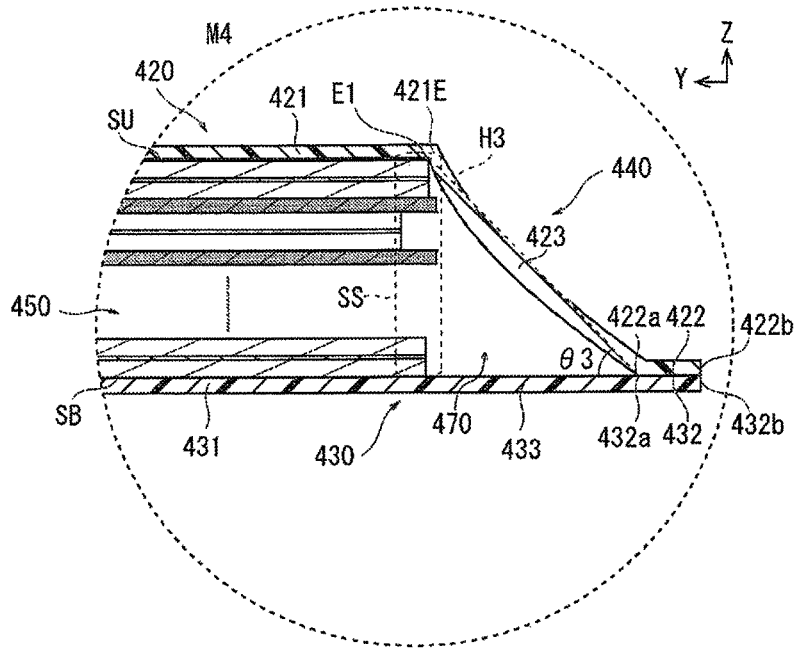
FIG. 19 is an enlarged view illustrating the volume adjustment portion of the lithium ion secondary battery, corresponding to the portion surrounded by the broken line portion M4 of FIG. 18.

FIG. 16 is a cross-sectional view corresponding to FIG. 4, illustrating the lithium ion secondary battery 400 according to the present embodiment. FIGS. 17(A) and (B) are schematic cross-sectional views corresponding to FIGS. 5(A) and (B). FIG. 18 is a cross-sectional view corresponding to FIG. 6, illustrating the lithium ion secondary battery 400 according to the present embodiment. FIG. 19 is an enlarged view illustrating the volume adjustment portion 440 of the lithium ion secondary battery 400 according to the present modified example, corresponding to the portion surrounded by the broken line portion M4 of FIG. 18.

As illustrated in FIGS. 16 and 17, the lithium ion secondary battery 400 according to the present embodiment comprises an electrolytic solution 10 (not shown), and a power generating element 450 that contains electrolyte layers 20 and a plurality of positive electrodes 30 and negative electrodes 40 layered with each of the electrolyte layers 20 therebetween, and that expands with use in the layering direction Z of the positive electrodes 30 and the negative electrodes 40. The lithium ion secondary battery 400 further comprises an exterior member 410 forming a tightly sealed space 480 containing a space 460 in which the power generating element 450 is housed, and an extra space 470. The extra space 470 is formed between the exterior member 410 and a side surface SS along the layering direction Z of the power generating element 450. The exterior member 410 is pressed against surfaces SU, SB intersecting the layering direction Z of the power generating element 450, due to a pressure difference between the exterior and the interior. The exterior member 410 includes a volume adjustment portion 440 that allows for an increase in the volume of the extra space 470 in accordance with a pressure rise inside the tightly sealed space 480. The volume adjustment portion 440 allows for an increase in the volume of the extra space 470 while maintaining the state in which the exterior member 410 is pressed against the surfaces SU, SB intersecting the layering direction Z of the power generating element 450.

The configuration of the lithium ion secondary battery 400 according to the present embodiment is the same as the configuration of the lithium ion secondary battery 300 according to the second embodiment, except that the configurations of the power generating element 450 and the exterior member 410 are different from the configurations of the power generating element 50 and the exterior member 310 of the lithium ion secondary battery 300 according to the second embodiment. Thus, descriptions of the configurations other than the power generating element 450 and the exterior member 410 are omitted.

Power Generating Element

The configuration of the power generating element 450 is the same as the configuration of the power generating element 50 of the lithium ion secondary battery 300 according to the second embodiment, except that the thickness of the power generating element 450 in the layering direction Z is half the thickness of the power generating element 50 in the layering direction Z. The thickness of the power generating element 450 in the layering direction Z can be adjusted by changing the number of laminations of the electrolyte layers 20, the positive electrodes 30, and the negative electrodes 40. If the number of laminations of the positive electrodes 30 is d and the capacity of the battery is Q, it is preferable that $0.7 \leq Q/d \leq 5.0$ be satisfied. Since a negative electrode 40 is disposed on the outermost layer of the power generating element 450, if the number of laminations of the positive electrodes 30 is d, the number of laminations of the negative electrodes 40 is d+1. In addition, in the case that a positive electrode 30 is disposed on the outermost layer of the power generating element 450, the number of laminations of the negative electrodes 40 may be set to d, to satisfy $0.7 \leq Q/d \leq 5.0$.

Exterior Member

The exterior member 410 includes a first exterior member 420 and a second exterior member 430, which are joined to each other, as illustrated in FIG. 17(A). The exterior member 410 forms a tightly sealed space 480 inside the exterior member 410.

The first exterior member 420 and the second exterior member 430 are joined to each other by an end portion 420E of the first exterior member 420 being joined to an end portion 430E of the second exterior member 430. The tightly sealed space 480 is formed by the first exterior member 420 and the second exterior member 430 being joined to each other.

Figure 17B:
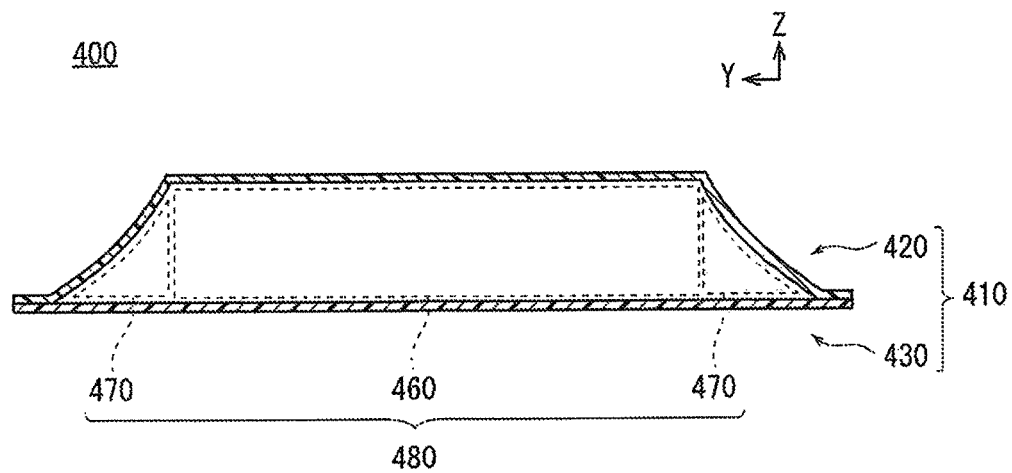

The tightly sealed space 480 is in a reduced pressure state. That is, the pressure inside the tightly sealed space 480 is lower than the pressure outside the tightly sealed space 480. The tightly sealed space 480 includes a space 460 in which the power generating element 450 is housed, and an extra space 470, as illustrated in FIG. 17(B).

The first exterior member 420 and the second exterior member 430 are joined in a state of sandwiching the power generating element 450 in the layering direction Z of the power generating element 450, as illustrated in FIG. 18.

The first exterior member 420 comprises an abutting portion 421 that abuts the surface SU intersecting the layering direction Z of the power generating element 450, a joint portion 422 that is joined to the second exterior member 430, and a connecting portion 423 that connects the abutting portion 421 and the joint portion 422.

The second exterior member 430 extends in the direction of the surface intersecting the layering direction of the power generating element 450. The second exterior member 430 comprises an abutting portion 431 that abuts the surface SB intersecting the layering direction Z of the power generating element 450, a joint portion 432 that is joined to the first exterior member 420, and a connecting portion 433 that connects the abutting portion 431 and the joint portion 432.

The abutting portion 421 is pressed against the surface SU intersecting the layering direction Z of the power generating element 450, due to the difference between the external and the internal pressure of the tightly sealed space 480 described above. The abutting portion 431 is similarly pressed against the surface SB intersecting the layering direction Z of the power generating element 450, due to said pressure difference.

The end portion 421E of the abutting portion 421 abuts an end portion E1 of the surface SU intersecting the layering direction Z of the power generating element 450.

The joint portion 422 and the joint portion 432 are joined, provided with a predetermined width.

The joint portion 422 comprises a first end portion 422a, which is disposed at a boundary between a portion of the first exterior member 420 that is joined to the second exterior member 430 and a portion that is not joined to the second exterior member 430, and a second end portion 422b that is different from the first end portion 422a.

The joint portion 432 comprises a first end portion 432a, which is disposed at a boundary between a portion of the second exterior member 430 that is joined to the first exterior member 420 and a portion that is not joined to the first exterior member 420, and a second end portion 432b that is different from the first end portion 432a.

In the exterior member 410, at locations in which the positive electrode tab 31a (negative electrode tab 41a) is taken out from the inside to the outside of the lithium ion secondary battery 400, the first exterior member 420 and the second exterior member 430 are joined via the positive electrode current collector 31 (negative electrode current collector 41) and the positive electrode tab 31a (negative electrode tab 41a) (refer to FIG. 16). In these locations, the boundary between the portion joined to the positive electrode current collector 31 (negative electrode current collector 41) or the positive electrode tab 31a (negative electrode tab 41a) and the portion not joined to the positive electrode current collector 31 (negative electrode current collector 41) or the positive electrode tab 31*a* (negative electrode tab 41*a*) corresponds to the first end portion 422*a*, 432*a*.

The connecting portion 423 connects the end portion 421E of the abutting portion 421 and the first end portion 422*a* of the joint portion 422. The connecting portion 433 connects the end portion 431E of the abutting portion 431 and the first end portion 432*a* of the joint portion 432.

The extra space 470 is formed between the connecting portion 423 and the connecting portion 433 and the side surface SS along the layering direction of the power generating element 450. The extra space 470 is disposed surrounding the power generating element 450.

The first exterior member 420 includes a volume adjustment portion 440 that allows for an increase in the volume of the extra space 470 by expanding in accordance with a pressure rise inside the tightly sealed space 480. The volume adjustment portion 440 allows for an increase in the volume of the extra space 470 while maintaining the state in which the exterior member 410 is pressed against the surface SU intersecting the layering direction Z of the power generating element 450. In the present embodiment, the volume adjustment portion 440 is configured by forming a loose portion in a part of the connecting portion 423.

In the present embodiment, the angle formed by the connecting portion 423 and the direction Y intersecting the layering direction Z of the power generating element 450 is regulated within a predetermined range. Specifically, the angle $\theta3$, which is formed by the straight line H3 that connects the end portion 421E of the surface SU intersecting the layering direction Z of the power generating element 450 and the first end portion 422*a* of the joint portion 422 and by the planar direction of the second exterior member 430, satisfies $15° \leq \theta3 \leq 62°$, as illustrated in FIG. 19. As described above, the planar direction of the second exterior member 430 is a direction intersecting the layering direction Z of the power generating element 450.

The lithium ion secondary battery 400 according to the present modified example comprising the configuration described above also exerts the same effects as the lithium ion secondary battery according to the second embodiment.

EXAMPLES

The present invention is described in further detail, using the following Examples A1-A19, B1-B16, and Comparative Examples A1-A3, and B1-B3. However, the technical scope of the present invention is not limited to the following examples.

Examples A1-A19 and Comparative Examples A1-A3 were mainly used in order to investigate the relationship between the capacity retention rate and the value of the ratio Vl/Va of the volume Vl of the power generating element relative to the volume Va of the tightly sealed space 80. In addition, Examples B1-B16 and Comparative Examples B1-B3 were mainly used in order to investigate the relationship between the capacity retention rate and the angle $\theta$ (corresponding to the average value $\theta a = (\theta1+\theta2)/2$ of $\theta1$ and $\theta2$, described above in the second embodiment) formed by a straight line that connects the sealing point of the laminate external casing and an end portion of the surface intersecting the layering direction of the power generating element and by the direction intersecting the layering direction of the power generating element.

The test method and the manufacturing method of the lithium ion secondary battery are common to Examples A1-A19, and B1-B16, as well as Comparative Examples A1-A3, and B1-B3. The lithium ion secondary batteries according to Examples A1-A19 and Comparative Examples A1-A3 are distinguished by the value of the ratio Vl/Va of the volume Vl of the power generating element relative to the volume Va of the tightly sealed space 80, or by the material of the negative electrode. Additionally, Examples B1-B16 and Comparative Examples B1-B3 are distinguished by the value of the angle $\theta$. The test method and the manufacturing method of the lithium ion secondary battery according to Examples A1-A19, and B1-B16, as well as Comparative Examples A1-A3, and B1-B3 will be described below.

Preparation of the Positive Electrodes 90 wt % of NMC complex oxide $LiNi_{0.5}Mn_{0.3}Co_{0.2}O_2$, 5 wt % of Ketjen black as conductive assistant, 5 wt % of polyvinylidene fluoride (PVdF) as binder, and an appropriate amount of NMP as slurry viscosity adjusting solvent were mixed to prepare a positive electrode active material slurry.

Next, the obtained positive electrode active material slurry was applied to an aluminum foil (thickness of 20 μm) as a current collector.

Next, compression-molding was carried out with a roll press machine after drying at 120° C. to prepare a positive electrode active material layer positive electrode.

A positive electrode active material layer was also formed on the rear surface with the same method as the method described above, to prepare a positive electrode made by positive electrode active material layers being formed on both surfaces of a positive electrode current collector.

Preparation of the Negative Electrodes 96.5 wt % of artificial graphite or silicon as negative electrode active material, 1.5 wt % of ammonium salt of carboxymethyl cellulose as binder, and 2.0 wt % of styrene butadiene copolymer latex were dispersed in purified water to prepare a negative electrode active material slurry.

Next, the negative electrode active material slurry was applied to a copper foil (thickness of 10 am), which becomes a negative electrode current collector.

Next, compression-molding was carried out with a roll press machine after drying at 120° C. to prepare a negative electrode active material layer negative electrode.

A negative electrode active material layer was also formed on the rear surface by the same method as the method described above to prepare a negative electrode made by negative electrode active material layers being formed on both surfaces of a negative electrode current collector.

Preparation of Cells

Power generating elements were prepared by alternately laminating the positive electrodes and the negative electrodes prepared by the above-described method with separators interposed therebetween.

Then, the prepared power generating elements were placed in an aluminum laminate sheet bag, and an electrolytic solution was injected.

A solution obtained by dissolving 1.0 M of LiPF6 in a mixed solvent of ethylene carbonate (EC):diethyl carbonate (DEC):ethyl methyl carbonate (EMC) (volume ratio 1:1:1) was used as the electrolytic solution.

Next, under vacuum conditions, the opening of the aluminum laminate bag was sealed such that the current extraction tabs connected to both electrodes are led out, to complete a laminate type lithium ion secondary battery.

In Examples B1-B16 and Comparative Examples B1-B3, angle θ, which is formed by a straight line that connects the sealing point of the laminate external casing and an end portion of the surface intersecting the layering direction of the power generating element and by the direction intersecting the layering direction of the power generating element, on the cross section of the completed lithium ion secondary battery, was confirmed with an X-ray CT device (SMX-225 CT, manufactured by Shimadzu Corporation, X-ray tube voltage: 170 kV, X-ray tube current: 40 μA).

Durability Test

Initial performance check—The completed batteries were subjected to 0.2C_CCCV charging (upper limit voltage 4.15V, 8 hours), and then subjected to 0.2C_CC discharging (lower limit voltage 2.5V cut), in a thermostatic chamber set to 25° C., to check the initial charge/discharge capacity. In addition, the volumes and thicknesses of the completed batteries were measured. The volumes of the batteries were measured by Archimedes' method. In addition, the thickness of the battery was multiplied by the area of the negative electrode to obtain the volume of the power generating element.

Durability Test

The completed batteries were subjected to 1,000 cycles of 1C_CCCV charging (upper limit voltage 4.15V, 2 hours) and 1C_CC discharging (lower limit voltage 2.5V cut), in a thermostatic chamber set to 45° C. It is possible to check the performance during the durability test at 25° C. during the durability test (for example, every 250 cycles).

Performance Check During the Durability Test

The batteries after the durability test were subjected to 0.2C_CCCV charging (upper limit voltage 4.15V, 8 hours), and then subjected to 0.2C_CC discharging (lower limit voltage 2.5V), in a thermostatic chamber set to 25° C., to check the charge/discharge capacity after the durability test. In addition, the volumes and thicknesses of the batteries after the durability test were measured. The volumes of the batteries were measured by Archimedes' method. In addition, the thickness of the battery was multiplied by the area of the negative electrode to obtain the volume of the power generating element.

Next, the test results of the capacity retention rate and the volume increase rate of the lithium ion secondary batteries according to Examples A1-A19 and B1-B16 as well as Comparative Examples A1-A3 and B1-B3 are considered.

Figure 20:
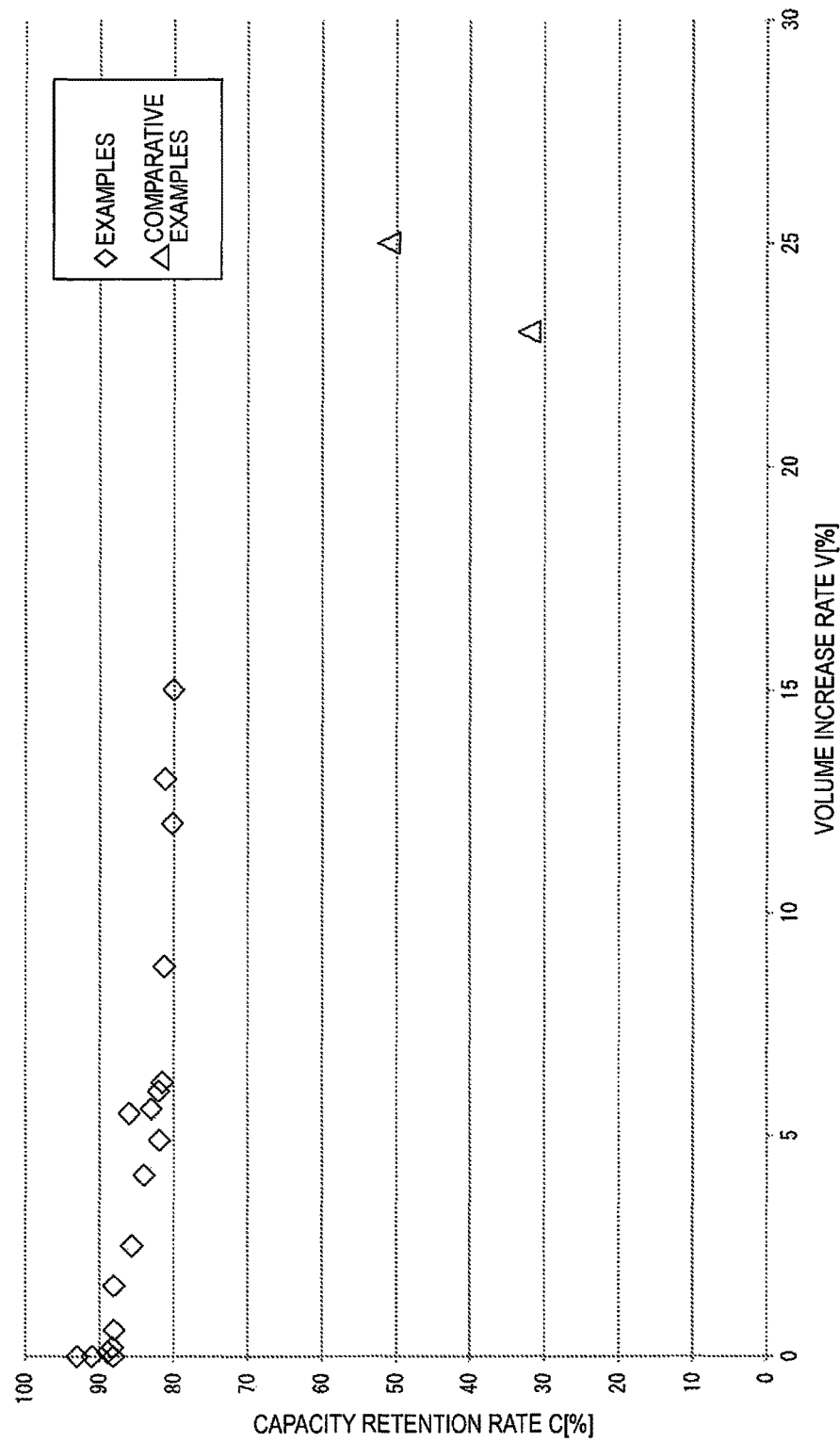
FIG. 20 is a view illustrating the relationship between the volume increase rate and the capacity retention rate of the lithium ion secondary battery according to the embodiment.

First, the test results of Examples A1-A19 and Comparative Examples A1-A3 are considered, with reference to Table 1 and FIG. 20.

Table 1 below is a table showing the test results of the capacity retention rate and the volume increase rate of the lithium ion secondary batteries according to Examples A1-A19 and Comparative Examples A1-A3.

TABLE 1

| | Positive Electrode | Negative Electrode | Vl/Va | Capacity Retention Rate C [%] | Volume Increase Rate V [%] |
|---|---|---|---|---|---|
| Example A1 | NMC | Gr | 0.988 | 82.0 | 6.0 |
| Example A2 | NMC | Gr | 0.993 | 81.3 | 8.8 |
| Example A3 | NMC | Gr | 0.984 | 85.6 | 2.5 |
| Example A4 | NMC | Gr | 0.945 | 88.0 | 0.6 |
| Example A5 | NMC | Gr | 0.949 | 86.0 | 5.5 |
| Example A6 | NMC | Gr | 0.940 | 84.0 | 4.1 |
| Example A7 | NMC | Gr | 0.995 | 80.1 | 15.0 |
| Example A8 | NMC | Gr | 0.991 | 80.2 | 12.0 |
| Example A9 | NMC | Gr | 0.955 | 88.2 | 0.2 |
| Example A10 | NMC | Gr | 0.960 | 88.1 | 0.0 |
| Example A11 | NMC | Gr | 0.951 | 88.8 | 0.1 |
| Example A12 | NMC | Gr | 0.823 | 91.0 | 0.0 |
| Example A13 | NMC | Si | 0.991 | 81.2 | 13.0 |
| Example A14 | NMC | Si | 0.978 | 88.0 | 1.6 |
| Example A15 | NMC | Si | 0.818 | 93.0 | 0.0 |
| Example A16 | NMC | Gr | 0.988 | 81.9 | 4.9 |
| Example A17 | NMC | Gr | 0.988 | 81.5 | 6.2 |
| Example A18 | NMC | Gr | 0.988 | 83.0 | 5.6 |
| Example A19 | NMC | Gr | 0.809 | 93.0 | 0.0 |
| Comparative Example A1 | NMC | Gr | 0.998 | 51.0 | 25.0 |
| Comparative Example A2 | NMC | Gr | 0.999 | 32.0 | 23.0 |
| Comparative Example A3 | NMC | Gr | 1.010 | — | — |

Table 1 shows the ratio Vl/Va of the volume Vl of the power generating element relative to the volume Va of the tightly sealed space 80, as well as the material used for the positive electrode and the negative electrode of the lithium ion secondary batteries according to Examples A1-A19 and Comparative Examples A1-A3. Additionally, the values of the capacity retention rate and the volume increase rate are indicated by "-" in Table 1 for lithium ion secondary batteries in which liquid depletion occurred during the test.

FIG. 20 is a view illustrating the relationship between the volume increase rate V % and the capacity retention rate C % of the lithium ion secondary battery according to Examples A1-A19 and Comparative Examples A1-A3.

Regarding Examples A1-A19, the ratio of the volume Vl of the power generating element relative to the volume Va of the tightly sealed space satisfied Vl/Va≤0.995, as shown in Table 1. Then, as shown in Table 1 and FIG. 20, Examples A1-A19 all comprise high capacity retention rates exceeding 80%.

On the other hand, regarding Comparative Example A1-A3, the ratio of the volume Vl of the power generating element relative to the volume Va of the tightly sealed space was Vl/Va>0.995, as shown in Table 1. Then, as shown in Table 1 and FIG. 20, Comparative Examples A1-A3 all comprise low capacity retention rates below 80%.

Therefore, it can be seen that the capacity retention rate is higher when Vl/Va≤0.995 compared to when Vl/Va>0.995. That is, it can be seen that liquid depletion is less likely to occur by setting Vl/Va≤0.995.

On the other hand, as shown in Table 1, it can be seen that the volume increase rate approaches 0% as Vl/Va approaches 0.8. It is thought that, since the ratio of the volume of the extra space relative to the volume Va of the tightly sealed space increases as Vl/Va approaches 0.8, the volume expansion of the power generating element in the layering direction is absorbed by the change in the shape of the extra space, and the volume increase rate approaches 0%. When Vl/Va becomes smaller than 0.8 and the ratio of the volume of the extra space increases further, the shape of the extra space tends to change significantly, as the pressure inside the tightly sealed space rises. When the shape of the extra space changes significantly, part of the gas that has moved to the extra space enters between the exterior member and the surface intersecting the layering direction of the power generating element, and it becomes difficult for the pressure from the exterior member to be uniformly applied to the surface intersecting the layering direction of the power generating element. Therefore, from the point of view of making the pressure that is applied from the exterior member to the surface intersecting the layering direction of the power generating element uniform to prevent a deterioration of the battery performance, it is advantageous to set Vl/Va≥0.8.

Figure 21:
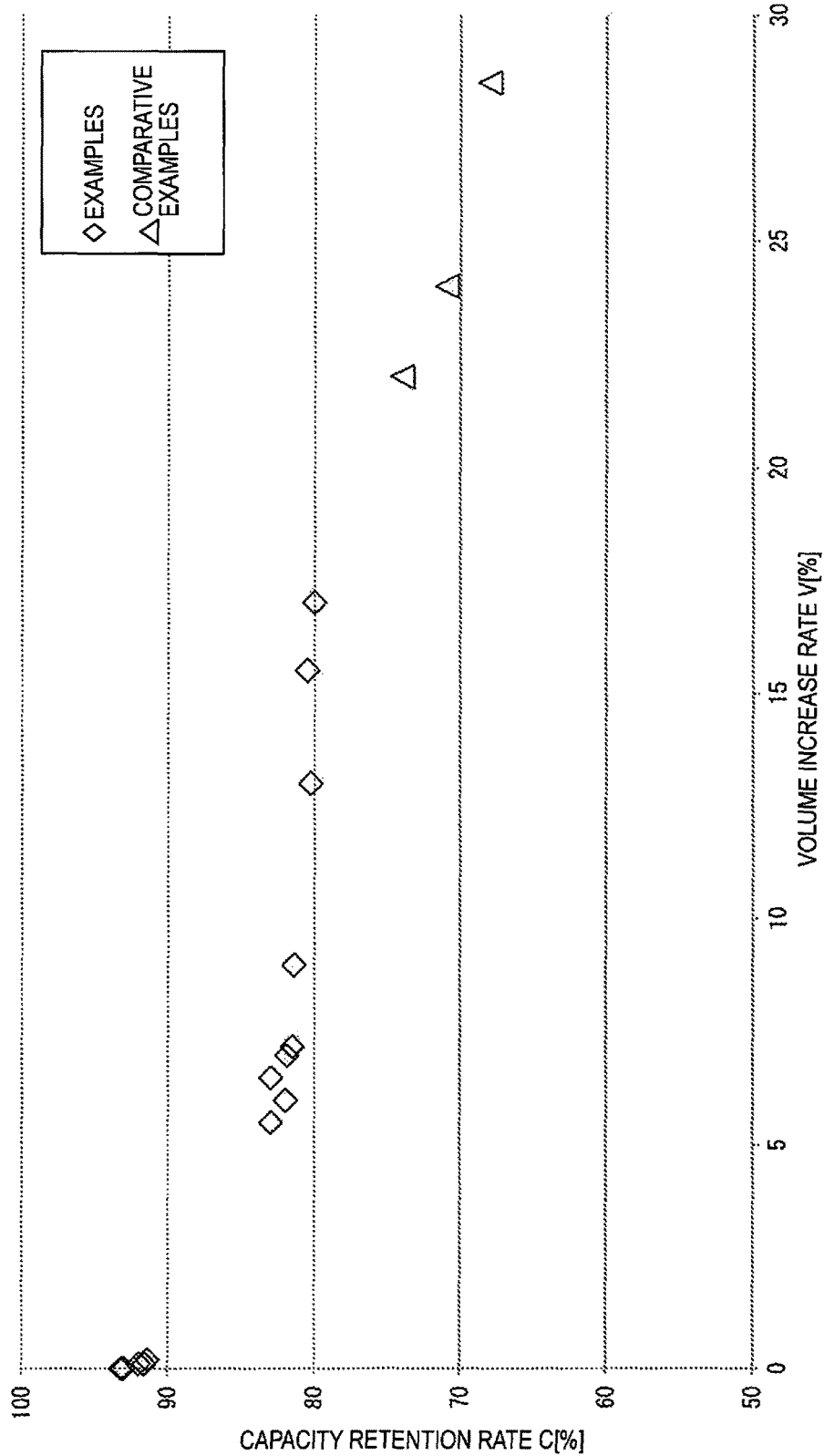
FIG. 21 is a view illustrating the relationship between the volume increase rate and the capacity retention rate of the lithium ion secondary battery according to another embodiment.

Next, the test results of Examples B1-B16 and Comparative Examples B1-B3 are considered, with reference to Table 2 and FIG. 21.

Table 2 below shows the test results of the capacity retention rate and the volume increase rate of the lithium ion secondary batteries according to Examples B1-B16 and Comparative Examples B1-B3.

TABLE 2

| | Positive Electrode | Negative Electrode | Angle θ[°] | Capacity Retention Rate C [%] | Volume Increase Rate V [%] |
|---|---|---|---|---|---|
| Example B1 | NMC | Gr | 49.5 | 82.0 | 6.0 |
| Example B2 | NMC | Gr | 53.4 | 81.4 | 9.0 |
| Example B3 | NMC | Gr | 61.4 | 80.0 | 17.0 |
| Example B4 | NMC | Gr | 45.0 | 83.0 | 6.5 |
| Example B5 | NMC | Si | 39.8 | 80.3 | 13.0 |
| Example B6 | NMC | Gr | 57.4 | 80.5 | 15.5 |
| Example B7 | NMC | Gr | 49.5 | 81.9 | 7.0 |
| Example B8 | NMC | Gr | 49.5 | 81.5 | 7.2 |
| Example B9 | NMC | Gr | 49.5 | 83.0 | 5.5 |
| Example B10 | NMC | Gr | 34.2 | 91.4 | 0.2 |
| Example B11 | NMC | Gr | 34.2 | 91.6 | 0.1 |
| Example B12 | NMC | Gr | 34.2 | 91.6 | 0.1 |
| Example B13 | NMC | Gr | 34.2 | 92.0 | 0.1 |
| Example B14 | NMC | Gr | 15.8 | 93.0 | 0.0 |
| Example B15 | NMC | Gr | 15.8 | 93.2 | 0.0 |
| Example B16 | NMC | Gr | 15.8 | 93.0 | 0.0 |
| Comparative Example B1 | NMC | Gr | 70.0 | 71.0 | 24.0 |
| Comparative Example B2 | NMC | Gr | 63.7 | 74.0 | 22.0 |
| Comparative Example B3 | NMC | Gr | 74.9 | 68.0 | 28.5 |

Table 2 shows the angle θ, which is formed by a straight line that connects the sealing point of the laminate external casing and an end portion of the surface intersecting the layering direction of the power generating element and by the direction intersecting the layering direction of the power generating element, as well as the material used for the positive electrode and the negative electrode of the lithium ion secondary batteries according to Examples B1-B16 and Comparative Examples B1-B3.

FIG. 21 is a view illustrating the relationship between the volume increase rate V % and the capacity retention rate C % of the lithium ion secondary battery according to Examples B1-B16 and Comparative Examples B1-B3.

As shown in Table 2, regarding Examples B1-B16, the angle θ satisfied θ≤62°. Then, as shown in Table 2 and FIG. 21, Examples B1-B16 all comprise high capacity retention rates exceeding 80%.

On the other hand, regarding comparative examples B1-B3, the angle θ was θ>62°. Then, as shown in Table 2 and FIG. 21, Comparative Examples B1-B3 all comprise low capacity retention rates below 80%.

Therefore, it can be seen that the capacity retention rate is higher when the angle θ, which is formed by a straight line that connects the sealing point of the laminate external casing and an end portion of the surface intersecting the layering direction of the power generating element and by the direction intersecting the layering direction of the power generating element, satisfies θ≤62°, compared to when θ>62°. That is, it can be seen that by setting θ≤62°, it becomes possible to more reliably maintain a state in which pressure from the exterior member acts uniformly on a surface intersecting the layering direction of a power generating element.

On the other hand, as shown in Table 2, it can be seen that the volume increase rate approaches 0% as θ approaches 15°. It is thought that, since the ratio of the volume of the extra space relative to the volume Va of the tightly sealed space increases as θ approaches 15°, the volume expansion of the power generating element in the layering direction is absorbed by the change in the shape of the extra space, and the volume increase rate approaches 0%. When θ becomes smaller than 15° and the ratio of the volume of the extra space increases further, the shape of the extra space tends to change significantly, as the pressure inside the tightly sealed space rises. When the shape of the extra space changes significantly, part of the gas that has moved to the extra space enters between the exterior member and the surface intersecting the layering direction of the power generating element, and it becomes difficult for the pressure from the exterior member to be uniformly applied to the surface intersecting the layering direction of the power generating element. Therefore, from the point of view of making the pressure that is applied from the exterior member onto the surface intersecting the layering direction of the power generating element uniform to prevent a deterioration of the battery performance, it is advantageous to set θ≥15°.

The present invention is not limited to the embodiment described above, and various modifications are possible within the scope of the claims.

For example, in the second embodiment and the third embodiment, the ratio of the volume Vl of the power generating element relative to the volume Va of the tightly sealed space 80 may also be regulated within a predetermined range, in the same manner as in the first embodiment.

In addition, in the second embodiment and the third embodiment, an expandable portion may be formed in the exterior member as the volume adjustment portion, in the same manner as in the modified example of the first embodiment.

Furthermore, in the first embodiment, the second embodiment, and the third embodiment, the exterior member is configured by joining a first exterior member and a second exterior member, which are configured as separate bodies. However, a form of the exterior member that is, for example, integrally configured in the form of a bag, is also included in the technical scope of the present invent.

The invention claimed is:

1. A flat type battery comprising:
    an electrolytic solution;
    a power generating element that contains electrolyte layers and a plurality of electrodes layered with each of the electrolyte layers therebetween, and that expands with use in a layering direction of the electrodes; and
    an exterior member forming a tightly sealed space containing a space in which the power generating element is housed, and an extra space formed between the exterior member and a side surface extending along the layering direction of the power generating element, the exterior member including a volume adjustment portion that allows for an increase in a volume of the extra space by expanding in accordance with a pressure rise inside the tightly sealed space while the exterior member is being pressed against surfaces intersecting the layering direction of the power generating element due to a pressure difference between the exterior and the interior, the volume adjustment portion allowing for an increase in the volume of the extra space while maintaining a state in which the exterior member is pressed against the surfaces intersecting the layering direction of the power generating element, the exterior member includes a first exterior member and a second exterior member, the first exterior member and the second exterior member have end portions joined to each other while in a state of sandwiching the power generating element in the layering direction of the power generating element, and before use an angle θ, which is formed between a straight line connecting the end portions where the first exterior member and the second exterior member are joined and an end portion of the surface intersecting the layering direction of the power generating element and a plane intersecting the layering direction of the power generating element, satisfies $15° \leq \theta \leq 34.2°$.

2. The flat type battery according to claim 1, wherein a ratio of the volume Vl of the power generating element relative to a volume Va of the tightly sealed space before use is set to $0.800 \leq Vl/Va \leq 0.995$.

3. The flat type battery as recited in claim 1, wherein the extra space is disposed surrounding the power generating element.

4. The flat type battery as recited in claim 1, wherein an expandable portion is formed in the exterior member as the volume adjustment portion.

5. The flat type battery as recited in claim 1, wherein the electrodes are electrode plates having a rectangular shape, and the electrode plates have an aspect ratio of 1-3.

6. The flat type battery as recited in claim 2, wherein the extra space is disposed surrounding the power generating element.

7. The flat type battery as recited in claim 2, wherein an expandable portion is formed in the exterior member as the volume adjustment portion.

8. The flat type battery as recited in claim 2, wherein the electrodes are electrode plates that each have a rectangular shape, and the electrode plates have an aspect ratio of 1-3.

9. The flat type battery as recited in claim 3, wherein an expandable portion is formed in the exterior member as the volume adjustment portion.

10. The flat type battery as recited in claim 3, wherein the electrodes are electrode plates that each have a rectangular shape, and the electrode plates have an aspect ratio of 1-3.

11. The flat type battery as recited in claim 4, wherein the electrodes are electrode plates that each have a rectangular shape, and the electrode plates have an aspect ratio of 1-3.

* * * * *